(12) United States Patent
Kobayashi et al.

(10) Patent No.: US 10,797,747 B2
(45) Date of Patent: *Oct. 6, 2020

(54) SIGNAL PROCESSING DEVICE AND METHOD AND PROGRAM

(71) Applicant: Sony Corporation, Tokyo (JP)

(72) Inventors: Seiji Kobayashi, Kanagawa (JP); Toshiyuki Hiroi, Tokyo (JP); Takehiro Sugita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/427,862

(22) Filed: May 31, 2019

(65) Prior Publication Data

US 2019/0288738 A1 Sep. 19, 2019

Related U.S. Application Data

(63) Continuation of application No. 15/321,334, filed as application No. PCT/JP2015/004044 on Aug. 13, 2015, now Pat. No. 10,348,359.

(30) Foreign Application Priority Data

Aug. 21, 2014 (JP) ................. 2014-168207

(51) Int. Cl.
*H04B 1/707* (2011.01)
*H04B 1/715* (2011.01)
(Continued)

(52) U.S. Cl.
CPC ............ *H04B 1/707* (2013.01); *H04B 1/715* (2013.01); *H04L 1/0083* (2013.01); *H04L 27/36* (2013.01); *H04L 69/324* (2013.01)

(58) Field of Classification Search
CPC ... H04L 27/2613; H04L 1/0083; H04L 27/36; H04L 69/324; H04B 1/707; H04B 1/71635
(Continued)

(56) References Cited

U.S. PATENT DOCUMENTS 6,353,627 B1 3/2002 Schilling
7,031,492 B1 4/2006 Furon
(Continued)

FOREIGN PATENT DOCUMENTS

CN 1465141 A 12/2003
JP 2003-087222 A 3/2003
WO WO-00/77963 A 12/2000

OTHER PUBLICATIONS

Japanese Office Action dated Jun. 26, 2018 for corresponding Japanese Application No. 2014-168207.
(Continued)

*Primary Examiner* — Emmanuel Bayard
(74) *Attorney, Agent, or Firm* — Michael Best & Friedrich LLP

(57) ABSTRACT

A signal processing method comprising rearranging transmission data so that a predictable portion of the transmission data is spread more uniformly in the transmission data, the predictable portion including information that is predictable by a receiver side. The phase of a carrier signal can be modulated based on the rearranged transmission data, and the modulated signal may be transmitted. The transmitted signal is received by the receiver side. A header position of each frame of the received signal is detected based on the information predictable to the receiver side. Once detected, the frames of the received signal are integrated, and the transmission data is decoded based on the integration. A signal processing device, a transmitter, and/or a receiver
(Continued)

may utilizes these methods to transmit, receive, and/or process signals.

12 Claims, 25 Drawing Sheets

(51) Int. Cl.
    *H04L 1/00*           (2006.01)
    *H04L 27/36*         (2006.01)
    *H04L 29/08*         (2006.01)

(58) Field of Classification Search
    USPC .................. 375/260, 265, 316, 340–341
    See application file for complete search history.

(56) References Cited

U.S. PATENT DOCUMENTS

| | | |
|---|---|---|
| 7,418,050 B1 | 8/2008 | Gardner et al. |
| 10,348,359 B2 * | 7/2019 | Kobayashi ............. H04B 1/707 |
| 2002/0064182 A1 | 5/2002 | Hoffmann et al. |
| 2002/0123358 A1 | 9/2002 | Butler |
| 2003/0072292 A1 | 4/2003 | Yoon et al. |
| 2003/0161543 A1 | 8/2003 | Tanaka |
| 2004/0267860 A1 | 12/2004 | Agami |
| 2007/0253502 A1 | 11/2007 | Park et al. |
| 2009/0034637 A1 * | 2/2009 | Hoshino ............. H04B 7/0417 375/260 |
| 2009/0122895 A1 | 5/2009 | Kim et al. |
| 2009/0268621 A1 * | 10/2009 | Hoshino ............. H04B 7/0632 370/252 |
| 2010/0322177 A1 | 12/2010 | Luo |
| 2011/0066911 A1 | 3/2011 | Yoshimoto et al. |
| 2013/0208619 A1 | 8/2013 | Kudo et al. |
| 2014/0019828 A1 | 1/2014 | Ionescu |

OTHER PUBLICATIONS

International Search Report PCT/ISA/220 dated Oct. 30, 2015 for PCT/JP2015/004044.
On-Ramp Wireless Incorporated, "On-Ramp Wireless Technology White Paper" 008-0012-00 Rev. H, Jan. 9, 2013.
Chinese Office Action dated Sep. 3, 2018 for corresponding Chinese Application No. 2015800433621.

* cited by examiner

FIG. 3

MINIMUM LECIM DSSS PHY RECEIVER SENSITIVITY(dBm)

| SPREADING FACTOR (chips/bit) | MODULATION RATE(ksym/s) | | | | |
|---|---|---|---|---|---|
| | 200 | 400 | 600 | 800 | 1000 |
| 16 | −115 | −112 | −110 | −109 | −108 |
| 32 | −118 | −115 | −113 | −112 | −111 |
| 64 | −121 | −118 | −116 | −115 | −114 |
| 128 | −124 | −121 | −119 | −118 | −117 |
| 256 | −127 | −124 | −122 | −121 | −120 |
| 512 | −130 | −127 | −125 | −124 | −123 |
| 1024 | −133 | −130 | −128 | −127 | −126 |
| 2048 | −136 | −133 | −131 | −130 | −129 |
| 4096 | −139 | −136 | −134 | −133 | −132 |
| 8192 | −142 | −139 | −137 | −136 | −135 |
| 16384 | −145 | −142 | −140 | −139 | −138 |
| 32768 | −148 | −145 | −143 | −142 | −141 |

SIGNAL PROCESSING DEVICE AND METHOD AND PROGRAM

CROSS REFERENCES TO RELATED APPLICATIONS

The present Application is a Continuation Application of U.S. patent application Ser. No. 15/321,334 filed Dec. 22, 2016, which is a 371 National Stage Entry of International Application No.: PCT/JP2015/004044, filed on Aug. 13, 2015, which in turn claims priority from Japanese Application No. 2014-168207, filed on Aug. 21, 2014, the entire contents of which are incorporated herein by reference.

TECHNICAL FIELD

The present technology relates to a signal processing device and method and a program, and more particularly, to a signal processing device and method and a program for suppressing a decrease in receiver sensitivity.

CROSS REFERENCE TO RELATED APPLICATIONS

This application claims the benefit of Japanese Priority Patent Application JP 2014-168207 filed on Aug. 21, 2014, the entire contents of which are incorporated herein by reference.

BACKGROUND ART

In radio communication of transmitting and receiving digital data, the limit of a radio communication range is determined by transmission power of radio wave, the performance of antennas used in transmitting and receiving data, and a transfer rate. An increase in transmission power is directly associated with power consumption of a transmitter, and there is a limit on increasing the transmission power. The performance of antennas can be improved by using Yagi-Uda antennas or the like.

However, the higher the performance of antennas, the larger the size and the more the structure becomes complex. Thus, the performance of usable antennas is limited.

Moreover, the transmission power is regulated by the Wireless Radio Act. Further, the antenna performance and the transmission power are regulated by the Wireless Radio Act depending on the frequency band of radio waves. As a result, there is a limit on the practical transmission power and antenna performance.

Direct sequence spread spectrum (DSSS) is known as a technique for realizing long-range radio communication under such restricts (for example, see NPL 1). DSSS is a technique of realizing high receiver sensitivity while eliminating the influence of noise by integrating received signals while multiplying the received signals by spreading codes. The sensitivity increases linearly by increasing the integration period (that is, lowering the transfer rate), and a global positioning system (GPS) that employs the DSSS scheme can receive signals stably in an electric field intensity of −150 dBm, for example.

A GPS transmits radio waves continuously with a stable phase. Thus, by employing a low-frequency phase locked loop (PLL) or delayed locked loop (DLL), stable phase synchronization is established in a low signal-to-noise ratio (SNR) state. If the phase is correct, weak signals can be detected by integrating and detecting the signals. When a dedicated radio frequency band as in GPS is allocated, it is possible to transmit signals continuously for a long period of time and to receive weak signals stably.

For example, a system that transmits information of sensors or the like using radio waves of the 920 MHz band is known. The 920 MHz band is a frequency band on which the ban has been removed from July, 2011 by the Ministry of International Affairs and Communications of Japan and anyone can use this frequency band without any permission or license. However, the maximum continuous transmission duration is limited to four seconds by the regulation (Association of Radio Industries and Businesses (ARIB) STD T-108). When the continuous transmission duration is shortened further to 0.2 seconds, for example, it is possible to allocate a larger number of channels and to transmit and receive signals with less interference.

CITATION LIST

Non Patent Literature

[NPL 1]
On-Ramp Wireless Incorporated, "On-Ramp Wireless Technology White Paper," 008-0012-00 Rev. H, Jan. 9, 2013

SUMMARY OF INVENTION

Technical Problem

Since the continuous transmission duration is restricted, a low-frequency PLL or DLL may not be mounted on a receiver which uses the 920 MHz band. Thus, the lower limit of the transfer rate is fixed, and as a result, the upper limit of the receiver sensitivity may be limited. That is, the receiver sensitivity may decrease as compared to when such restrictions are absent. For example, a commercial 920 MHz-band radio communication device has a limited receiver sensitivity of −100 dBm to −120 dBm, which has a sensitivity difference of several tens of dB as compared to the GPS.

The present technology has been proposed in view of the problems above and an object thereof is to suppress a decrease in receiver sensitivity.

According to an embodiment of the present technology, there may be provided a signal processing device including: a rearranging unit that rearranges transmission data so that a predictable portion of the transmission data is spread more uniformly in the transmission data, the predictable portion including information that is predictable by a receiver side; a modulating unit that generates a modulated signal by modulating a phase of a carrier signal based on the rearranged transmission data; and a transmitting unit that transmits a transmission signal based on the modulated signal.

The rearranging unit may divide the predictable portion of the transmission data into parts and divide a remaining portion of the transmission data into parts and rearrange the transmission data so that the rearranged transmission data alternates between one of the parts of the predictable portion and one of the parts of the remaining portion.

The predictable portion of the transmission data may include 13 octets that are predictable by the receiver side and the remaining portion of the transmission data may include 6 octets that are not predictable by the receiver side. The rearranging unit may divide the predictable portion into parts every two octets and divide the remaining portion into parts every octet and rearrange the transmission data so that the rearranged transmission data alternates between two octets that are predicable by the receiver side and one octet that is not predictable by the receiver side.

The remaining portion of the transmission data may include payload information and the predictable portion of the transmission data may include a predetermined synchronization pattern that is appended to the payload information.

The remaining portion of the transmission data may further include a cyclic redundancy check code of the payload information.

The modulating unit may modulate the phase of the carrier signal according to binary phase-shift keying modulation.

The modulating unit may modulate the phase of the carrier signal according to quadrature phase-shift keying modulation.

The rearranging unit may rearrange the same transmission data a plurality of number of times. The modulating unit may modulate the phase of the carrier signal whenever the transmission data is rearranged by the rearranging unit. The transmitting unit may transmit the transmission signal whenever the phase of the carrier signal is modulated by the modulating unit.

According to an embodiment of the present technology, there is provided a signal processing method, which may include: rearranging transmission data so that a predictable portion of the transmission data is spread more uniformly in the transmission data, the predictable portion including information that is predictable by a receiver side; generating a modulated signal by modulating a phase of a carrier signal based on the rearranged transmission data; and transmitting a transmission signal based on the modulated signal.

According to an embodiment of the present technology, there may be provided a program for causing a computer to function as: a rearranging unit that rearranges transmission data so that a predictable portion of the transmission data is spread more uniformly in the transmission data, the predictable portion including information that is predictable by a receiver side; a modulating unit that generates a modulated signal by modulating a phase of a carrier signal based on the rearranged transmission data; and a transmitting unit that transmits a transmission signal based on the modulated signal.

According to another embodiment of the present technology, there is provided a signal processing device, which may include: a receiving unit that receives a transmission signal and generates a reception signal based thereon, the transmission signal being for transmitting transmission data that has been rearranged so that a predictable portion of the transmission data is spread more uniformly in the transmission data, the predictable portion including information that is predictable by the signal processing device; a detecting unit that detects a header position of each of frames of the reception signal based on the information that is predictable by the signal processing device; an integrating unit that integrates the frames of the reception signal; and a decoding unit that decodes the transmission data from the output of the integrating unit.

The detecting unit may extract a known synchronization pattern from the reception signal, where the information that is predictable to the signal processing device includes the synchronization pattern; generate a known spreading code; perform fast Fourier transform on the known spreading code to obtain complex spectra; perform fast Fourier transform on the reception signal to obtain complex reception signal spectra; perform inverse fast Fourier transform on the complex spectra and the complex reception signal spectra to obtain cross-correlation values; calculate cross-correlation values in a predetermined period; and detect peaks of the cross-correlation values as the header positions of the frames.

The detecting unit may detect the peaks of the cross-correlation values by detecting n values in descending order from a maximum value, where n is a predetermined number of frames.

The signal processing device may further comprise a parameter calculating unit that calculates a predetermined parameter from the reception signal, wherein the detecting unit detects the header position of each of the frames based on the predetermined parameter. The parameter calculating unit may calculates a frequency correction value of the reception signal and an initial phase of the reception signal in respective predetermined time blocks. The signal processing device may further include a correcting unit that corrects a frequency of the reception signal using the calculated frequency correction value and corrects an initial phase of the reception signal using the calculated initial phase.

The parameter calculating unit may calculate a cross-correlation value indicating a correlation between the reception signal and a known synchronization pattern in respective predetermined time blocks as the parameter. The integrating unit may integrate the respective frames of the reception signal corrected by the correcting unit using the cross-correlation value calculated by the parameter calculating unit as a weighting factor of the time block.

The transmission signal may have a carrier signal of which the phase is modulated according to binary phase-shift keying modulation.

The transmission signal may have a carrier signal of which the phase is modulated according to quadrature phase-shift keying modulation.

An unknown portion of the transmission data may include payload information and a cyclic redundancy check code of the information. The decoding unit may determine the presence of an error in the payload information included in the transmission data using the cyclic redundancy check code.

According to another embodiment of the present technology, a signal processing method may include: receiving a transmission signal and generating a reception signal therefrom, the transmission signal being for transmitting transmission data that has been rearranged so that a predictable portion of the transmission data is spread more uniformly in the transmission data, the predictable portion including information that is predictable by a receiver; detecting a header position of each of frames of the reception signal based on the information that is predictable by the signal processing device; integrating the frames of the reception signal; and decoding the transmission data from the integrated reception signal.

Further, according to another embodiment of the present technology, a program for causing a computer to function as: a receiving unit that receives a transmission signal and generates a reception signal based thereon, the transmission signal being for transmitting transmission data that has been rearranged so that a predictable portion of the transmission data is spread more uniformly in the transmission data, the predictable portion including information that is predictable by the computer; a detecting unit that detects a header position of each of frames of the reception signal based on the information that is predictable by the signal processing device; an integrating unit that integrates the frames of the reception signal; and a decoding unit that decodes the transmission data from the output of the integrating unit.

Solution to Problem

A method according to an aspect of the present technology includes rearranging transmission data so that a portion that is known to a receiver side of the transmission data is spread more uniformly in the transmission data; modulating a phase of a carrier signal using the rearranged transmission data; and transmitting a transmission signal which is the carrier signal of which the phase is modulated.

A method according to another aspect of the present technology includes: receiving a transmission signal for transmitting transmission data rearranged so that a known portion of the transmission data is spread more uniformly in the transmission data; detecting a header position of each of frames of a reception signal which is the received transmission signal; calculating a predetermined parameter for respective frames of the reception signal, of which the header position is detected; correcting the respective frames of the reception signal using the calculated parameter; integrating the corrected respective frames of the reception signal; and decoding the transmission data from the integrated reception signal.

Advantageous Effects of Invention

According to the present technology, it is possible to process signals. Moreover, according to the present technology, it is possible to suppress a decrease in the receiver sensitivity.

BRIEF DESCRIPTION OF DRAWINGS

FIG. 3 is a diagram illustrating expected values of receiver sensitivities at a spreading factor.

DESCRIPTION OF EMBODIMENTS

Hereinafter, modes (hereinafter referred to as embodiments) for carrying out the present disclosure will be described. The description will be given in the following order:

1. First embodiment (Transmitter);
2. Second embodiment (Receiver); and
3. Third embodiment (Computer)

1. First Embodiment

<System>

Figure 1:
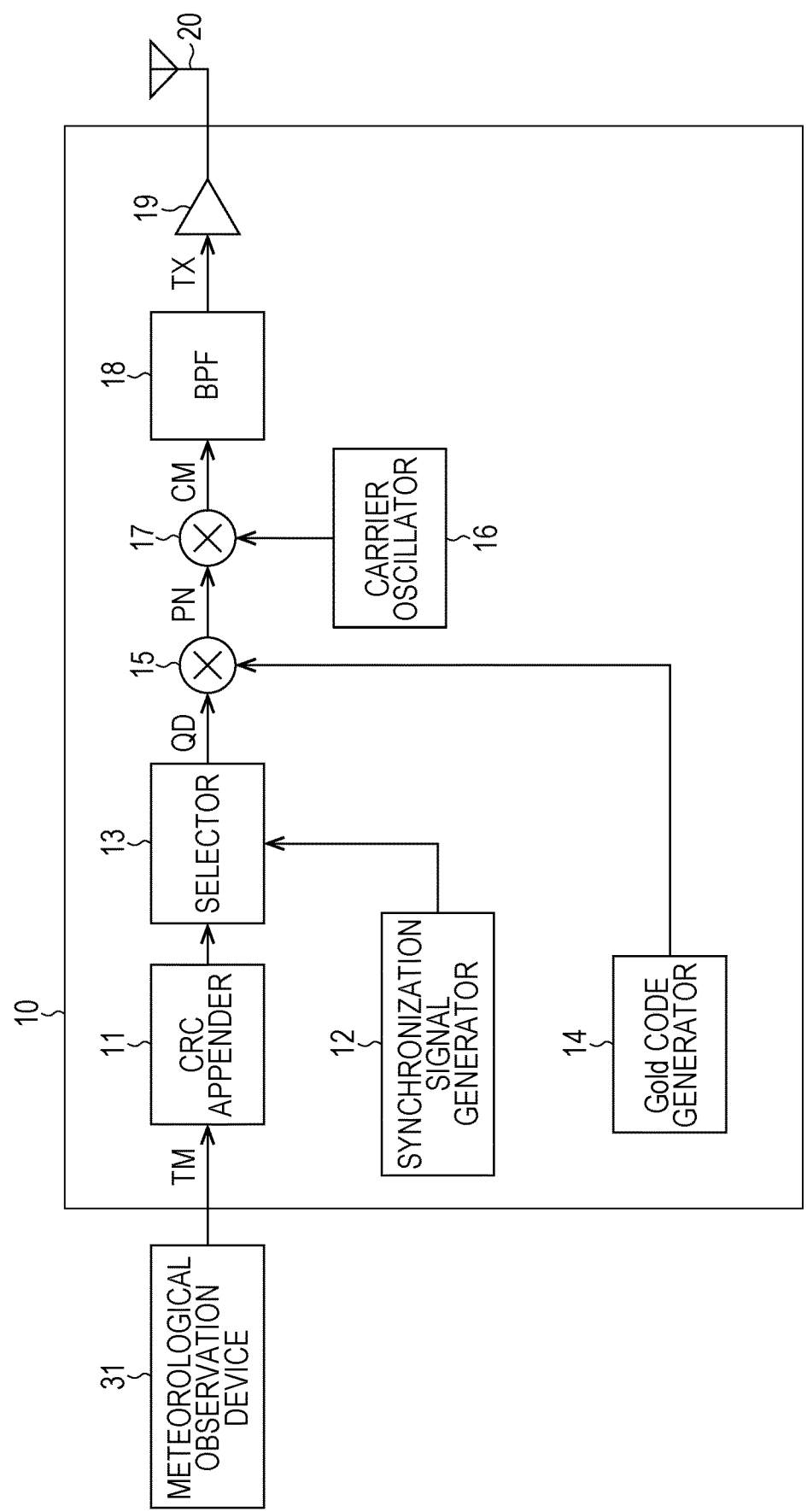
FIG. 1 is a block diagram illustrating an example of a main configuration of a transmitter.

FIG. 1 illustrates an example of a transmitter that transmits radio signals. In FIG. 1, a transmitter 10 is a device that transmits meteorological observation data TM supplied from a meteorological observation device 31 from an antenna 20 as radio waves (radio signals).

The meteorological observation device 31 is a device that observes meteorological data such as temperature, sunshine, precipitation, and the direction and velocity of wind, for example. The meteorological observation device 31 includes various sensors necessary for observing these items of meteorological data and a controller for controlling these sensors. The meteorological observation device 31 supplies the observed meteorological data (meteorological observation data) to the transmitter 10. For example, when temperature, precipitation, wind direction, and wind velocity each have an information quantity of one octet (8 bits), the meteorological observation data TM has an information quantity of four octets (32 bits).

The meteorological observation device 31 is installed in a place such as a mountain area, for example, where it is difficult for a person to observe the meteorological data by himself or herself (for example, a place where it is difficult for a person to access). The transmitter 10 is installed near the meteorological observation device 31. That is, the meteorological observation device 31 and the transmitter 10 are installed in a place where it is difficult to prepare a large external power supply. Thus, it is necessary to drive these devices using a small power supply such as a battery or a photovoltaic power generator. That is, these devices need to be driven with smaller power consumption.

The meteorological observation data supplied from the meteorological observation device 31 is transmitted to a receiver installed in an urban area (for example, in facilities such as a university research facility or a data center) at the foot of a mountain, for example. The receiver supplies the received meteorological observation data to a server or the like. That is, the transmitter 10 needs to transmit radio signals to a long distance. The receiver installed at the foot of a mountain can use a power supply of an electric lamp line. Thus, the receiver can mount a high-performance central processing unit (CPU) thereon and execute sophisticated arithmetic processing.

That is, the transmitter 10 needs to be driven by a battery with smaller power consumption. The receiver needs to have high-sensitivity reception performance with the ability to perform long-distance communication. Moreover, a communication channel has a limited continuous transmission duration. Although the requirements are strict, since the quantity of information transmitted is small, a high transfer rate is not necessary. Moreover, it does not matter even if the receiver consumes a large amount of power.

<DSSS Scheme>

A direct sequence spread spectrum (DSSS) scheme has been used in high-sensitivity transceivers. An example of the DSSS scheme will be described.

As illustrated in FIG. 1, the transmitter 10 includes a cyclic redundancy check (CRC) appender 11, a synchronization signal (SYNC) generator 12, a selector 13, a Gold code generator 14, a multiplier 15, a carrier oscillator 16, a multiplier 17, a band-pass filter (BPF) 18, an amplifier 19, and an antenna 20. The transmitter 10 transmits the meteorological observation data TM supplied from the meteorological observation device 31 wirelessly.

Reed-Solomon codes, convolution codes, and other codes may be further added to the transmitter 10 as necessary.

Figure 2:
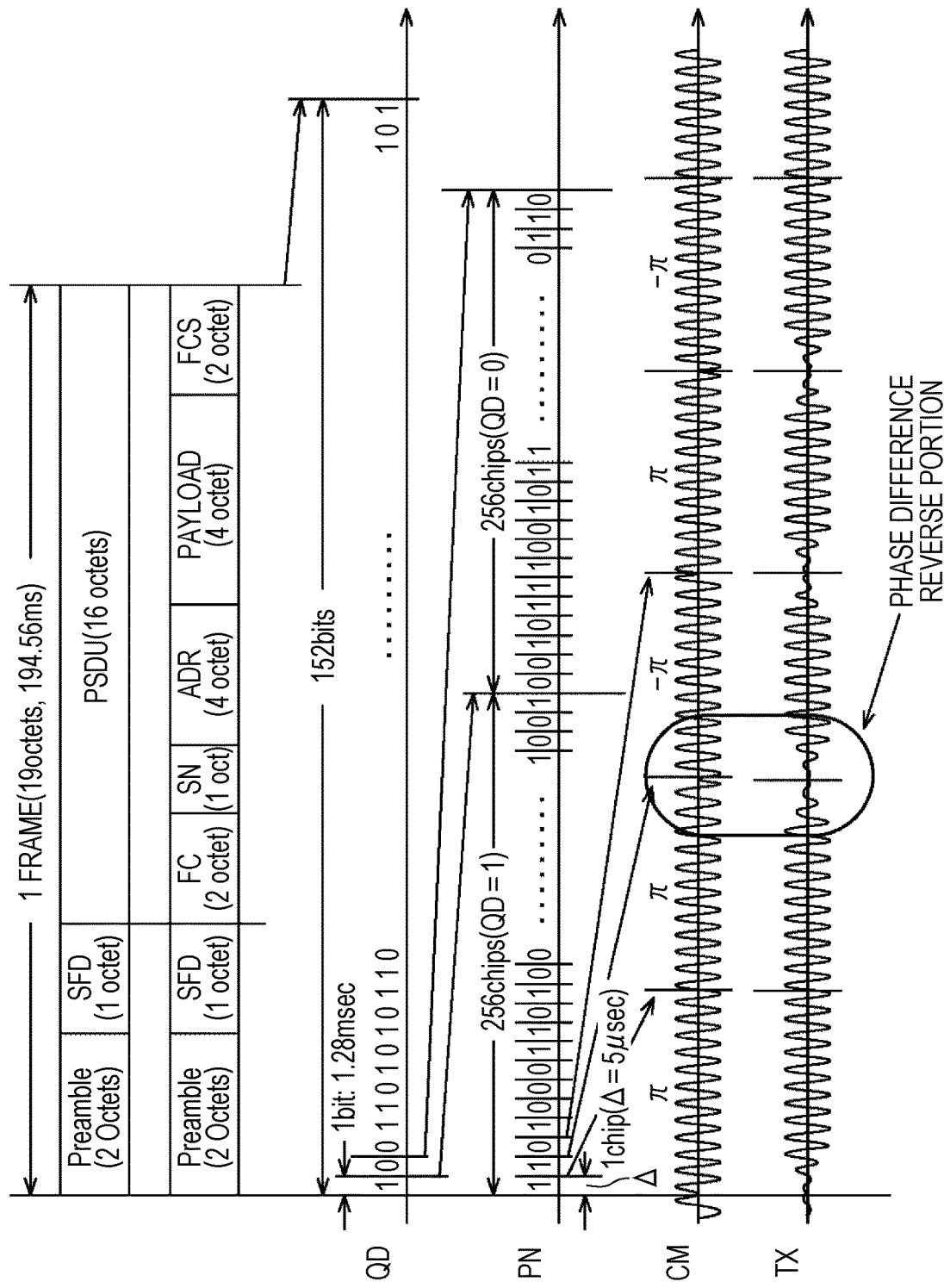
FIG. 2 is a diagram for describing an example of signals in respective units.

FIG. 2 is a schematic diagram illustrating a frame format of a transmission packet. As illustrated on the first row from the top of FIG. 2, a transmission packet includes a preamble of two octets, a SFD (start-of-frame delimiter) of one octet, and a PSDU (PHY Service Data Unit) of 16 octets. Here, the preamble and the SFD are fixed data. The preamble may be a bit stream of "0011111101011001," for example. Moreover, the SFD may be a bit stream of "00011100," for example.

As illustrated on the second row from the top of FIG. 2, the PSDU of 16 octets includes a frame control (FC), a sequence number (SN), a transceiver address (ADR), a payload (PAYLOAD), and a frame check sequence (FCS).

The frame control (FC) is digital information of two octets and is information indicating a configuration, the number of bits, and the like of information following the frame control. The frame control is a fixed bit stream and may be a bit stream of "0010000000100110," for example. The sequence number (SN) is digital information of one octet and is counted up whenever new data is transmitted. By checking this sequence number, a receiver can determine whether the subject data is new data. The transceiver address (ADR) is information of four octets and is information on a transmitter address number for identifying a transmitter and a receiver address number for identifying a receiver. The payload (PAYLOAD) is digital information of four octets and the meteorological observation data TM is set therein as it is. The frame check sequence (FCS) is a cyclic redundancy check code of two octets and is information for checking whether an error has occurred in communication data.

The synchronization signal generator 12 generates these items of information such as the preamble, the SFD, the frame control, the sequence number, and the transceiver address and supplies the information to the selector 13. Moreover, the CRC appender 11 appends the frame check sequence calculated for the payload obtained by copying the meteorological observation data TM supplied from the meteorological observation device 31 to the payload and supplies the payload to the selector 13.

The selector 13 appends information such as a preamble, a SFD, a frame control, a sequence number, and a transceiver address to the payload having the frame check sequence appended thereto to generate transmission data QD.

As illustrated on the third row from the top of FIG. 2, the transmission data QD of one frame includes 152 bits (19 octets). The Gold code generator 14 includes two M-sequence (Maximum Sequence) generators and generates a pseudo-random number sequence having a length of 256 chips. The multiplier 15 multiplies the pseudo-random number sequence and the transmission data QD to generate a pseudo-random number sequence PN.

That is, in the pseudo-random number sequence PN, one bit of the transmission data QD is expanded to a pseudo-random number sequence (256 chips). As illustrated on the fourth row from the top of FIG. 2, a data length of the pseudo-random number sequence PN is 38400 chips (150× 256).

Here, when the 920 MHz band is considered, since a bandwidth of one transmission channel is 200 KHz, the time Δ necessary for transmitting information of one chip is approximately 5 µs to 10 µs. In the timing chart illustrated in FIG. 2, the time Δ is set to 5 µs (chip-rate=200 KHz). In this case, the transmission data QD of one frame is wirelessly transmitted in a total period of 194.56 ms.

The carrier oscillator 16 oscillates a carrier frequency to be used in wireless transmission and supplies the carrier frequency to the multiplier 17. The multiplier 17 modulates the polarity of the carrier frequency according to the pseudo-random number sequence PN to create a modulated signal CM of the DSSS scheme. The modulated signal CM is supplied to the band-pass filter 18.

In modulation according to the DSSS scheme (in this example, BPSK modulation), the carrier frequency is modulated so that the carrier phase becomes π when the pseudo-random number sequence PN is "1". Moreover, the carrier frequency is modulated so that the carrier phase becomes −π (the polarity is reversed) when the pseudo-random number sequence N is "0". The modulated signal CM of which the polarity is reversed in this manner spreads over wide frequency components since the modulated signal changes abruptly at switching points. If the modulated signal is transmitted wirelessly as it is, the modulated signal may affect adjacent radio communication.

Thus, the band-pass filter (BPF) 18 limits the frequency component of the modulated signal CM to be near the carrier frequency. In this manner, a transmission signal TX of which the band is limited by the band-pass filter 18 is obtained. In the band-limited transmission signal TX illustrated in FIG. 2, a phase switching point changes smoothly. The transmission signal TX is amplified by the amplifier 19 and is then radiated from the antenna 20.

As described above, in the DSSS scheme, one bit of the transmission data QD is spread into 256 chips of the pseudo-random number sequence PN and is transmitted. The receiver can reproduce a reception signal QD by reproducing the same Gold codes as those used in transmission and multiplying and integrating the Gold codes with a reception signal. High sensitivity can be obtained by increasing the code length (spreading factor) of the Gold codes. In FIG. 2, although the spreading factor is set to 256, higher sensitivity can be obtained by further increasing the spreading factor.

FIG. 3 is a part of the specifications of IEEE 802.15.4K and illustrates expected sensitivity at a spreading factor given on the leftmost column. From this table, it can be understood that, when a chip-rate is 200 K/s, an expected receiver sensitivity at a spreading factor of 256 is −127 dBm. Moreover, when the spreading factor is increased to a maximum value (32768), the receiver sensitivity is expected to be improved up to −148 dBm. It can be understood that the spreading factor 256 is 128 times the spreading factor 32768, and as a result, it can be expected that the sensitivity can be improved approximately by 21 dB.

Figure 4:
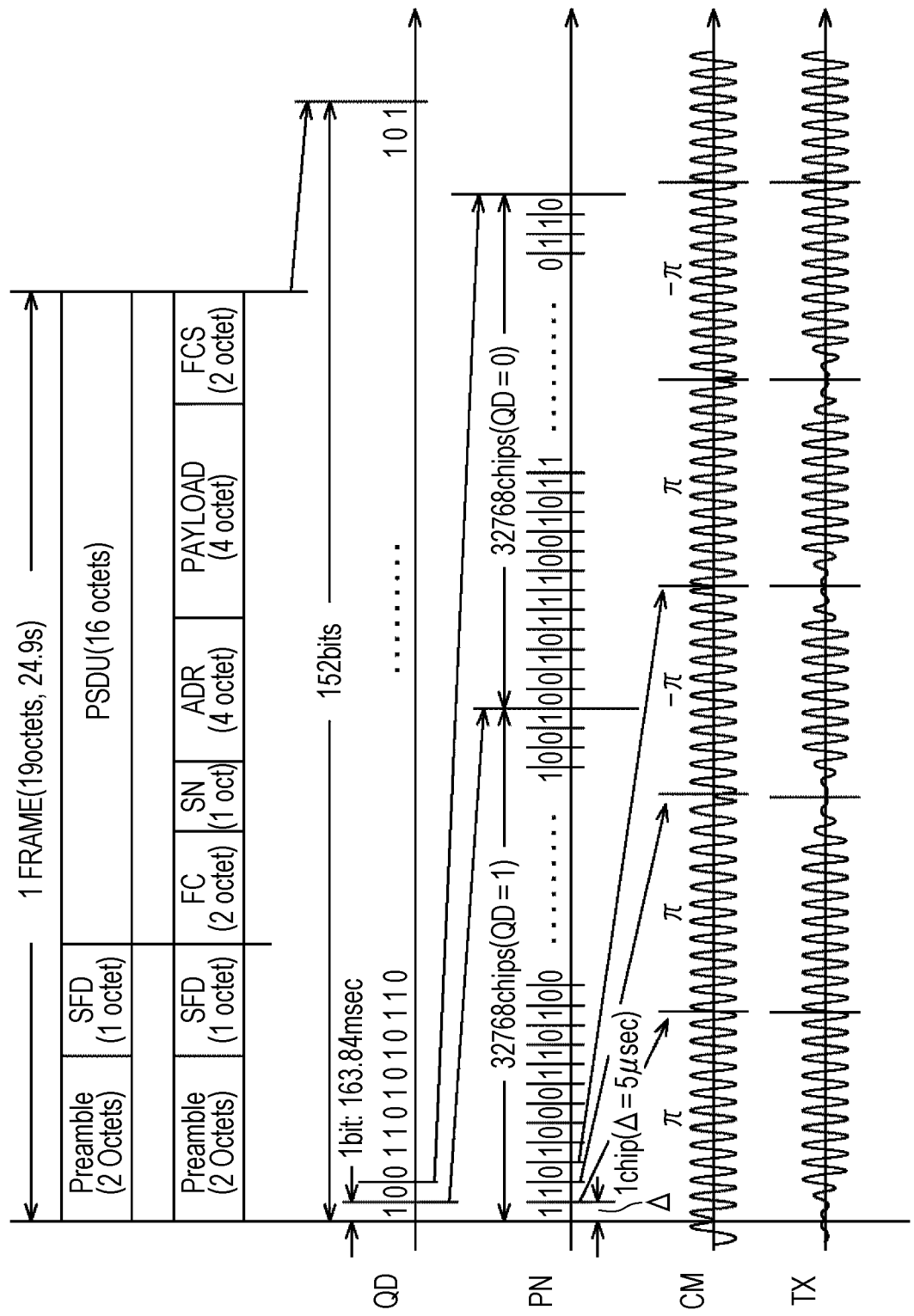
FIG. 4 is a diagram for describing an example of signals in respective units when a spreading factor is 32768.

FIG. 4 illustrates a case in which the spreading factor is set to the maximum value (32768) of the IEEE 802.15.4K standard. It can be understood that, if the spreading factor is increased in order to obtain higher sensitivity, practically, two problems occur. That is, the first problem is the restriction on a continuous transmission duration in the domestic law.

In FIG. 4 (when the spreading factor is set to 32768), the transmission time for one bit is 163.84 msec (Δx32768). As a result, the time necessary for transmitting an entire one packet (152 bits) is approximately 24.9 sec. However, a maximum continuous transmission duration permitted for the 920 MHz band in Japan is "4 seconds" according to the ARIB STD T-108 regulations. Thus, the spreading factor of 32768 could not be applied in the 920 MHz band in Japan.

Conversely, when a maximum spreading factor at which data can be transmitted in the continuous transmission duration (4 seconds) permitted for the 920 MHz band is calculated, the upper limit spreading factor is 4096 and the receiver sensitivity corresponding to the spreading factor is −139 dBm as read from FIG. 3. Since the upper limit of the receiver sensitivity is limited in this manner, there is a concern that the receiver sensitivity may decrease substantially.

It has been described that the continuous transmission duration is 4 seconds. However, strictly speaking, according to the ARIB STD T-108 regulations, the frequency region where the continuous transmission duration of 4 seconds is permitted is limited to some frequency regions. That is, when the continuous transmission duration is set to 4 seconds, the number of frequency channels that can be used for transmission and reception is limited. In contrast, when the continuous transmission duration is 0.2 seconds or shorter, data can be transmitted and received in a larger number of frequency bands. If a broader range of frequency bands is available, the influences of interference and the like can be suppressed.

When the 802.15.4K standard is applied using the continuous transmission duration of 0.2 seconds or shorter, the maximum spreading factor is 128 as described in FIG. 2. In this case, the expected receiver sensitivity is −128 dBm (see FIG. 3). The receiver sensitivity level of −128 dBm can be realized even if the DSSS scheme is not employed.

According to the conventional DSSS scheme, there is a concern that the continuous transmission duration may increase and it may not be possible to obtain a sufficient receiver sensitivity in the 920 MHz band in Japan. Moreover, when the number of transmission channels is increased, it may be desirable to further shorten the continuous transmission duration to 0.2 seconds or shorter. However, in this case, the receiver sensitivity may decrease further.

Moreover, in the conventional DSSS scheme, when a spreading factor of 32768 is employed, only one bit of information can be integrated and detected by time-integrating 32768 chips. The time necessary for integrating and detecting one bit of information is 164 msec. The same time is necessary for phase detection performed by a phase locked loop (PLL) or a delayed locked loop (DLL). A phase detection circuit such as a PLL or a DLL includes a feedback circuit, and the loop response time is longer by one digit (10 times) than the response time of a detection circuit. Thus, the response time of the PLL (or DLL) of a receiver is expected to be approximately 1.6 seconds.

This becomes a restriction on "phase fluctuation" of the carrier oscillator 16 provided in the transmitter 10. That is, the phase of the carrier oscillator 16 is necessary to "do not vary when observed for 1.6 seconds". However, it can be understood that, if an oscillator that oscillates a high frequency of 920 MHz is manufactured at a low cost, the phase easily varies due to the internal noise of the oscillator.

It can be understood that a GPS uses a stable phase oscillator which uses a rubidium oscillator, and thus, has a small phase fluctuation even if the loop response time exceeds one second. However, the rubidium oscillator is very expensive (several tens of thousands of Yen or higher) and consumes a large amount of power. Although such an oscillator may be mounted on an expensive GPS satellite, employing such an oscillator in the transmitter 10 used in such a sensor network as described above may increase the cost to an extent so as not to be allowable and is not practical.

That is, in the carrier oscillator 16 which is not such expensive and consumes such a small amount of power as to be usable in the transmitter 10, there is a concern that the upper limit of the spreading factor that can be used practically may be fixed due to the phase fluctuation.

<Rearrangement of Transmission Data>

Thus, the transmission data is rearranged so that a portion that is known to a receiver side of the transmission data is uniformly spread in the transmission data, a carrier signal is phase-modulated using the rearranged transmission data, and a transmission signal which is the phase-modulated carrier signal is transmitted.

By doing so, the maximum continuous transmission duration can be shortened. Thus, it is possible to construct a transceiver system that is robust against interference. Moreover, it is possible to improve the effective SNR without exceeding the regulation of the maximum transmission duration defined by the Wireless Radio Act. Further, even when a phase fluctuation occurs in a frame, it is possible to correct phase and frequency optimally. As a result, a reception signal weaker than the conventional signal can be decoded correctly even if the reception signal is embedded in noise, for example. That is, it is possible to suppress a decrease in the receiver sensitivity.

A portion that is known to a receiver side of transmission data and a portion that is unknown to a receiver side of transmission data each may be divided into a plurality of portions and the divided portions may be rearranged so that the respective items of partial data of the divided known portions and the respective items of partial data of the divided unknown portions are arranged alternately.

Moreover, the transmission data may be configured to include a portion of 13 octets that is known to the receiver side and a portion of 6 octets that is unknown to the receiver side. The portion known to the receiver side may be divided every two octets, and the portion unknown to the receiver side may be divided every octet, and the transmission data may be rearranged so that the partial data of the known portions of two octets and the partial data of the unknown portions of one octet are arranged alternately.

Moreover, a portion that is unknown to the receiver side of transmission data may include transmission target information and a portion that is known to the receiver side of the transmission data may include a predetermined synchronization pattern that is appended to the transmission target information.

Further, the portion that is unknown to the receiver side of transmission data may further include a cyclic redundancy check code of the transmission target information.

Further, the phase of the carrier signal may be modulated according to binary phase-shift keying using the rearranged transmission data.

Further, the phase of the carrier signal may be modulated according to quadrature phase-shift keying using the rearranged transmission data.

Further, the same transmission data may be rearranged a plurality of number of times, and the carrier signal may be phase-modulated every rearrangement to transmit the transmission signal.

<Transmitter>

Figure 5:
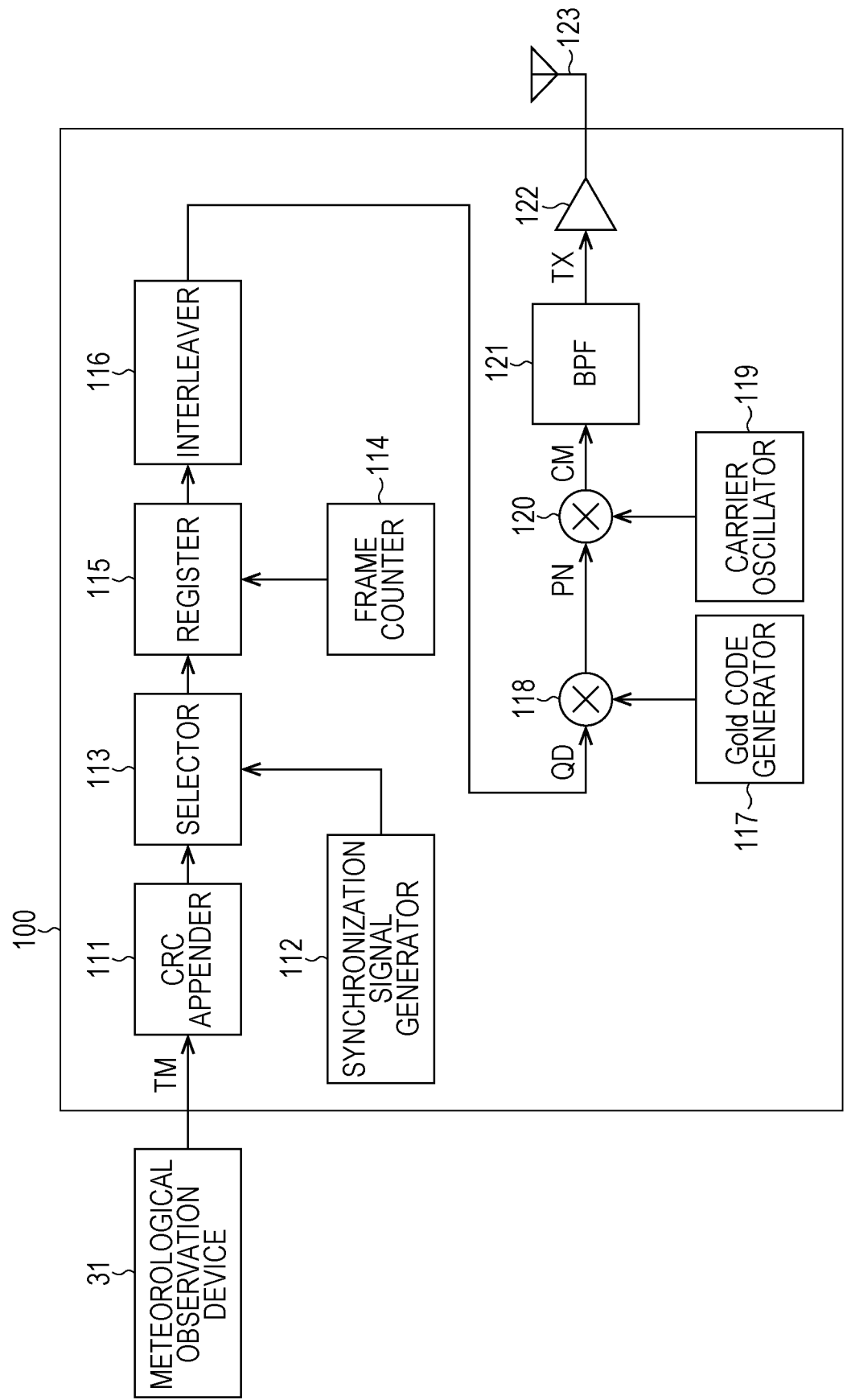
FIG. 5 is a block diagram illustrating an example of a main configuration of a transmitter.

FIG. 5 illustrates an example of a main configuration of a transmitter which is an embodiment of a signal processing device to which the present technology is applied. A transmitter 100 illustrated in FIG. 5 is a device that transmits the meteorological observation data (observation data such as, for example, temperature, sunshine, precipitation, and the direction and velocity of wind) supplied from the meteorological observation device 31 as a radio signal similarly to the transmitter 10 of FIG. 1. The transmitter 100 is installed near the meteorological observation device 31, for example, and transmits the radio signal from a mountain or the like up to a receiver (that is, a transmission distribution destination at a long distance) installed in an urban area (for example, in facilities such as a university research facility or a data center) at the foot of a mountain, for example.

Figure 6:
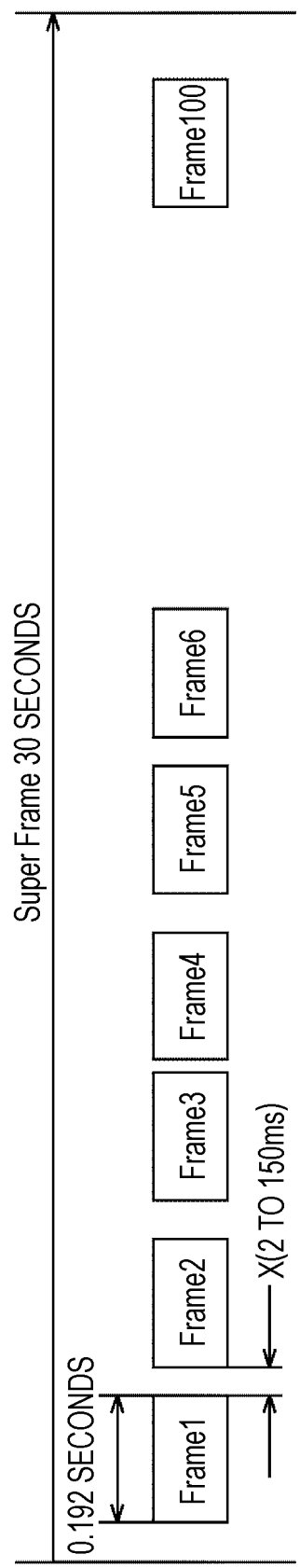
FIG. 6 is a diagram illustrating an example of a main configuration of a super frame.

FIG. 6 illustrates an entire frame structure of a transmission signal transmitted by the transmitter 100. In the case of the transmitter 10, the frame period is as large as 24.9 seconds as in the example illustrated in FIG. 4. In contrast, in the case of the transmitter 100, a continuous transmission duration of one transmission is 0.192 seconds as illustrated in FIG. 6. That is, since the continuous transmission duration is smaller than 0.2 seconds, many transmission channels can be allocated to this transmission. As a result, it is possible to select a relatively empty channel and transmit a signal over the selected channel and to construct a system that is more robust against interference. By employing the present technology, it is possible to construct a high-sensitivity transceiver system even when such a short frame length is used.

Frames are transmitted such that one data transmission is performed in respective super frames of 30 seconds. In this period of 30 seconds, frames of 0.192 seconds occur repeatedly 100 times at the maximum. Here, an inter-frame gap x is at least 2 ms. The gap x changes every time depending on the carrier sensing result (that is, a channel congestion state). When the 30-second period is averaged, frames are transmitted approximately at the rate of once every 0.3 seconds. As a result, 100 frames are transmitted in 30 seconds. The number of transmittable frames varies slightly depending on the channel congestion state. Although the signals transmitted in 100 frame transmissions are optional, it will be described that the same signals are transmitted.

As illustrated in FIG. 5, the transmitter 100 includes a cyclic redundancy check (CRC) appender 111, a synchronization signal (SYNC) generator 112, a selector 113, a frame counter 114, a register 115, an interleaver 116, a Gold code generator 117, a multiplier 118, a carrier oscillator 119, a multiplier 120, a band-pass filter 121, an amplifier 122, and an antenna 123.

The CRC appender 111 appends a cyclic redundancy check code (CRC) for error correction to the meteorological observation data TM supplied from the meteorological observation device 31 and supplies the meteorological observation data to the selector 113. The cyclic redundancy check code may be an optional code and the data length thereof is optional.

The synchronization signal generator 112 generates a predetermined synchronization pattern and supplies the synchronization pattern to the selector 113. The synchronization pattern may be an optional pattern and the data length thereof is optional.

The selector 113 selects an input appropriately to append the synchronization pattern supplied from the synchronization signal generator 112 to the meteorological observation data TM to which the cyclic redundancy check code supplied from the CRC appender 111 is appended to generate transmission data QD.

The selector 113 supplies the transmission data QD which is the meteorological observation data TM to which the cyclic redundancy check code and the synchronization pattern are appended to the register 115.

Figure 7:
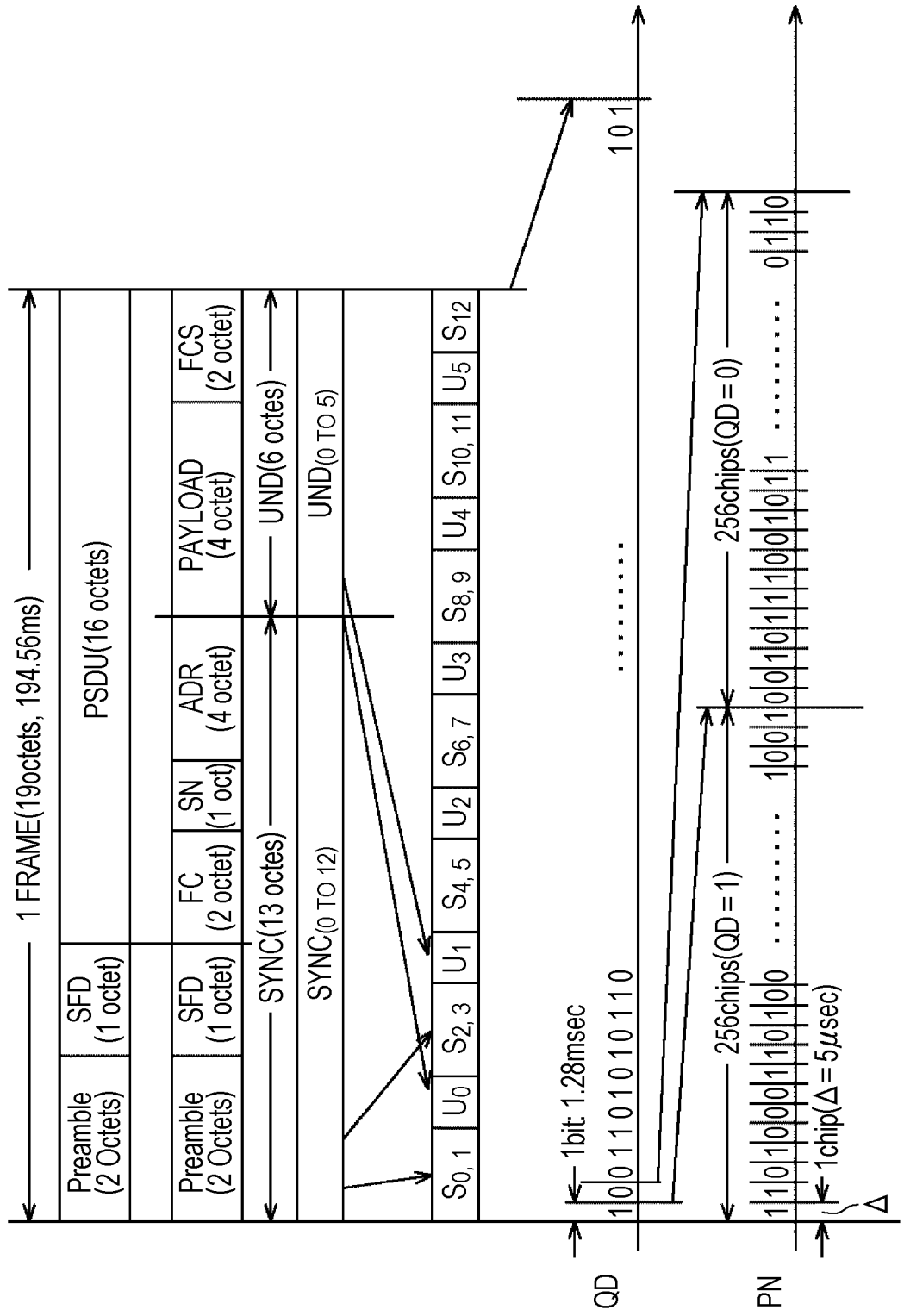
FIG. 7 is a diagram for describing an example of signals in respective units.

As illustrated on the second row from the top of FIG. 7, in each frame, the meteorological observation data TM is copied as a payload and a frame check sequence (FCS) is appended thereto. Further, the synchronization pattern (a preamble, a SFD, a frame control (FC), a sequence number (SN), and a transceiver address (ADR)) is appended thereto.

This synchronization pattern is information which does not depend on the meteorological observation data TM. In other words, all bits (13 octets) of this synchronization pattern are known to the receiver. The information that is "known" to the receiver side is referred to as a synchronization pattern (SYNC). The above-described configuration example is an example and the configuration of the synchronization pattern (SYNC) is optional. For example, information other than that described above may be included in the synchronization pattern (SYNC), and some or the entire part of the above-described items of information may not be included in the synchronization pattern (SYNC).

In contrast, the meteorological observation data TM transmitted as the payload and the frame check sequence (FCS) are information that may not be predicted by the receiver. The information that is "unknown" to the receiver side is referred to as UND (UNknown Data).

The frame counter 114 of FIG. 5 is a counter that counts the number of transmitted frames and counts the number from 0 to 99 and supplies the counted value to the register 115.

The register 115 is a 19-octet (152-bit) register. When the counted value supplied from the frame counter 114 is "0," the register 115 imports the output (transmission data QD corresponding to one frame) of the selector 113 and maintains the transmission data therein. The register 115 maintains the next transmission data QD corresponding to one frame until the counted value supplied from the frame counter 114 becomes "0". The register 115 supplies the value maintained therein to the interleaver 116 appropriately. That is, the same transmission data QD is output from the register 115 during the super frame period. Subsequently, when the counted value supplied from the frame counter 114 becomes "0," the register 115 imports the output (the transmission data QD corresponding to one frame) of the selector 113 again and maintains the transmission data therein.

In the case of the transmitter 10 (FIG. 1), the transmission data QD output from the selector 13 is supplied to the multiplier 15 and is multiplied by the pseudo-random number sequence generated in the Gold code generator 14. That is, as illustrated on the third row from the top of FIG. 7, the synchronization pattern (SYNC) is transmitted first and subsequently UND is transmitted.

In contrast, in the transmitter 100, the interleaver 116 decomposes the synchronization pattern (SYNC) so as to be spread between UNDs as illustrated on the fourth row from the top of FIG. 7. In this case, the synchronization pattern (SYNC) is spread substantially uniformly. That is, the interleaver 116 rearranges the transmission data so that the portions that are known to the receiver side, of the transmission data QD are spread in the transmission data more uniformly.

In the example of FIG. 7, the synchronization pattern (SYNC) is 13 octets of information and the UND is 6 octets of information. When the 13 octets of synchronization pattern (SYNC) are decomposed every octets to obtain SYNC0 to SYNC12 and the 6 octets of UND are decomposed every octets to obtain UND0 to UND5, the interleaver 116 rearranges these items of data in the following order, for example.

SYNC1, SYNC1, UND0, SYNC2, SYNC3, UND1, ..., UND5, SYNC12

When the synchronization pattern known to the receiver is transmitted by spreading over the entire frame in this manner, the receiver that receives the signal can estimate the frequency and the initial phase of the transmission carrier accurately in respective short frames. As a result, the receiver can receive the signal with high sensitivity even if the continuous transmission duration is short.

An example of the rearranged transmission data QD is illustrated on the fifth row from the top of FIG. 7. The interleaver 116 supplies the transmission data QD rearranged in this manner to the multiplier 118.

The Gold code generator 117 includes two M-sequence (Maximum Sequence) generators and generates a pseudo-random number sequence having a length of 256 bits (256 chips). For example, the Gold code generator 117 generates a bit stream of a predetermined pattern having a length of 256 bits as the pseudo-random number sequence. The pseudo-random number sequence may be an optional sequence and the data length thereof is optional. The Gold code generator 117 supplies the pseudo-random number sequence to the multiplier 118.

The multiplier 118 generates a pseudo-random number sequence PN by multiplying the rearranged transmission data QD supplied from the interleaver 116 and the pseudo-random number sequence supplied from the Gold code generator 117. That is, the multiplier 118 allocates the pseudo-random number sequence to the respective bits of the transmission data QD to generate the pseudo-random number sequence PN of 38400 bits (152 bits×256 chips) from the respective transmission packets.

In this case, the pseudo-random number sequence allocated to the bits (QD=0) of which the value of the transmission data QD is "0" has bit values that are reverse to those of the pseudo-random number sequence allocated to the bits (QD=1) of which the value of the transmission data QD is "1". That is, for example, the multiplier 118 allocates a pseudo-random number sequence to the bits (QD=0) of which the value of the transmission data QD is "0" and allocates a pseudo-random number sequence having the reversed bit values to the bits (QD=1) of which the value of the transmission data QD is "1". More specifically, for example, as illustrated at the bottom of FIG. 7, the multiplier 118 allocates a pseudo-random number sequence "1101000110100 . . . 1001" to the bits (QD=1) of which the value of the transmission data QD is "1" and allocates a pseudo-random number sequence "0010111001011 . . . 0110" to the bits (QD=0) of which the value of the transmission data QD is "0".

In this pseudo-random number sequence PN, the spreading factor is 256 similarly to the example of FIG. 2 and a chip-rate $\Delta$ is 5 µs similarly to the example of FIG. 2. The multiplier 118 supplies the pseudo-random number sequence PN generated in this manner to the multiplier 120.

The carrier oscillator 119 oscillates a carrier frequency used for wireless transmission and supplies the carrier frequency to the multiplier 120. The multiplier 120 performs BPSK modulation as the DSSS scheme by modulating the polarity of the carrier frequency according to the pseudo-random number sequence PN.

That is, the polarity of the carrier frequency is modulated so that the carrier phase becomes $\pi$ when the pseudo-random number sequence PN is "1," and the carrier phase becomes $-\pi$ (the polarity is reversed) when the pseudo-random number sequence PN is "0".

The multiplier 120 supplies the modulation results to the band-pass filter (BPF) 121 as a modulated signal CM.

The modulated signal CM of which the polarity is reversed in this manner spreads over wide frequency components since the modulated signal changes abruptly at switching points. If the modulated signal is transmitted wirelessly as it is, the modulated signal may affect radio communication of similar bands.

Thus, the band-pass filter 121 limits the frequency component of the modulated signal CM to be near the carrier frequency. The band-pass filter 121 supplies the modulated signal CM of which the band is limited in this manner to the amplifier 122 as a transmission signal TX.

The amplifier 122 amplifies the supplied transmission signal TX and radiates the transmission signal TX from the antenna 123 as a radio wave (radio signal). That is, the amplifier 122 transmits the amplified transmission signal TX via the antenna 123 as a radio signal.

By doing so, the transmission frame is transmitted from the antenna 123 as a frame of 0.2 seconds or shorter in a state in which the synchronization pattern (SYNC) that is known to the receiver is spread approximately uniformly. Thus, the transmitter 100 can suppress a decrease in the receiver sensitivity.

In other words, the transmitter 100 can transmit the radio signal to a farther distance while suppressing an increase in power consumption of the entire device. Thus, when this transmitter 100 is employed, a system for transmitting meteorological observation data obtained by the meteorological observation device 31 installed in a place such as a mountain area, for example, where it is difficult for a person to observe the meteorological data by himself or herself and where it is difficult to prepare a large external power supply to an urban area (for example, in facilities such as a university research facility or a data center) at the foot of a mountain, for example can be realized more easily.

<Flow of Transmitting Process>

Figure 8:
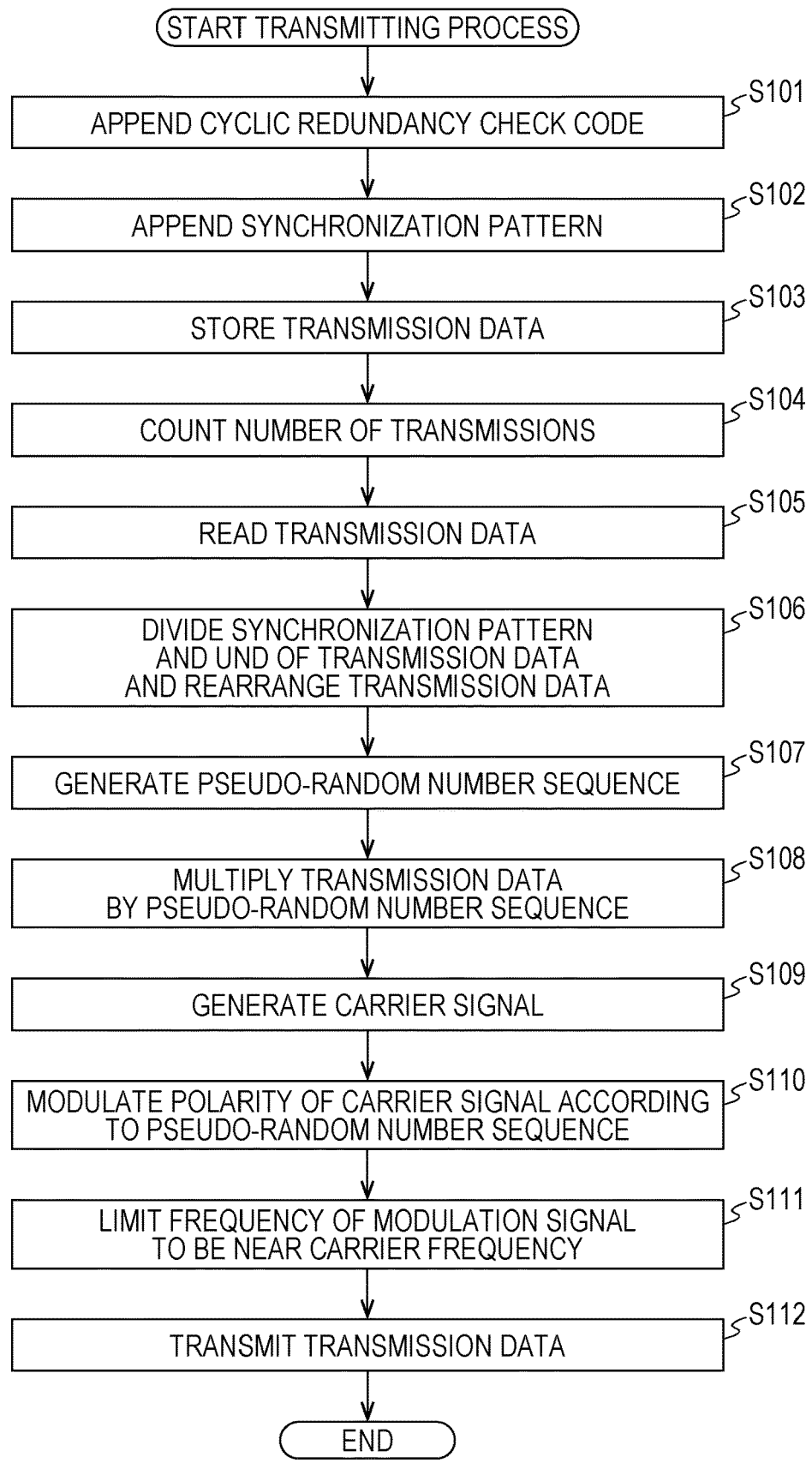
FIG. 8 is a flowchart for describing an example of the flow of a transmitting process.

Next, an example of the flow of a transmitting process executed in the transmitter 100 having the above-described configuration will be described with reference to the flowchart of FIG. 8. When transmission data (for example, meteorological observation data) is input, the transmitter 100 starts the transmitting process.

When the transmitting process starts, the CRC appender 111 appends a cyclic redundancy check code (CRC) to the transmission data (payload) in step S101.

In step S102, the synchronization signal generator 112 generates a predetermined synchronization pattern (that is known to the receiver) and the selector 113 appends the synchronization pattern to transmission data to generate transmission data QD corresponding to one frame.

In step S103, the register 115 stores the transmission data QD corresponding to one frame, generated in step S102 at the time point at which the counted value of the frame counter 114 becomes "0".

In step S104, the frame counter 114 counts the number of transmissions of the transmission data QD corresponding to one frame, maintained in the register 115.

In step S105, the interleaver 116 reads the transmission data QD corresponding to one frame maintained in the register 115.

In step S106, the interleaver 116 divides the synchronization pattern and the UND of the transmission data QD and rearranges the transmission data QD so that the synchronization pattern is spread more uniformly.

In step S107, the Gold code generator 117 generates a predetermined pseudo-random number sequence.

In step S108, the multiplier 118 multiplies the pseudo-random number sequence by the rearranged transmission data QD to generate a pseudo-random number sequence PN.

In step S109, the carrier oscillator 119 generates a carrier signal.

In step S110, the multiplier 120 modulates the polarity of the carrier signal according to the pseudo-random number sequence PN to generate a modulated signal.

In step S111, the band-pass filter 121 limits the frequency of the modulated signal to be near a carrier frequency to generate a transmission signal TX.

In step S112, the amplifier 122 amplifies the transmission signal TX and transmits the transmission signal TX via the antenna 123 as a radio signal.

The processes of the respective steps can be executed in an optional order and may be executed in parallel, and may be executed repeatedly as necessary. The respective processes of the transmitting process are executed repeatedly for respective frames when transmission data is input continuously.

By executing the transmitting process described above, the transmitter 100 can transmit transmission frames as frames of 0.2 seconds or shorter by spreading the synchronization pattern (SYNC) that is known to the receiver substantially uniformly and can suppress a decrease in the receiver sensitivity.

Although it has been described that the transmitter 100 performs BPSK modulation, a phase shift amount is optional and the present technology is not limited to this. For example, the transmitter 100 may perform QPSK (quadrature phase-shift keying) modulation. In the case of QPSK modulation, a phase shift amount is $\pi/2$, and the carrier wave has four phases of 0, $\pi/2$, $\pi$, $3\pi/2$. In this case, the Gold code generator 117 of the transmitter 100 may generate such a pseudo-random number sequence that shifts a transmission data stream QD by four phases, and the multiplier 118 may multiplies the pseudo-random number sequence by the transmission data stream QD to generate a pseudo-random number sequence PN that modulates the carrier frequency according to QPSK modulation (quadrature phase-shift keying).

The data transmitted by the transmitter 100 is optional and is not limited to the meteorological observation data. That is, the transmitter 100 can be applied to an optional system and can be applied to a system other than a system that observes the meteorological data.

Moreover, although it has been described that the transmitter 100 transmits the transmission signal TX as a radio signal, the transmitter 100 may transmit the transmission signal TX via an optional cable communication medium.

2. Second Embodiment

<Reception of Transmission Signal TX>

For a receiver to receive the transmission signal TX transmitted as frames of 0.2 seconds or shorter while spreading the synchronization pattern (SYNC) known to the receiver substantially uniformly, first, the receiver receives a transmission signal for transmitting the transmission data rearranged so that the known portion of the transmission data is spread in the transmission data more uniformly. Subsequently, the receiver detects a header position of each of the frames of a reception signal which is the received transmission signal, calculates a predetermined parameter in the respective frames of the reception signal, of which the header position is detected, corrects the respective frames of the reception signal using the calculated parameters, and integrates the respective corrected frames of the reception signal. Finally, the receiver decodes the transmission data from the integrated reception signals.

By doing so, it is possible to receive and decode the transmission signal TX of which the maximum continuous transmission duration is short. Thus, it is possible to construct a transceiver system that is robust against interference. Moreover, it is possible to improve the effective SNR without exceeding the regulation of the maximum transmission duration defined by the Wireless Radio Act. Further, even when a phase fluctuation occurs in a frame, it is possible to correct phase and frequency optimally. As a result, a reception signal weaker than the conventional signal can be decoded correctly even if the reception signal is embedded in noise, for example. That is, it is possible to suppress a decrease in the receiver sensitivity.

A known synchronization pattern may be extracted from the reception signal to generate known spreading codes. Fast Fourier transform may be performed on the known spreading codes to obtain complex spectra. Fast Fourier transform may be performed on the reception signal to obtain complex reception signal spectra. Inverse fast Fourier transform may be performed on the complex spectra and the complex reception signal spectra to obtain cross-correlation values. Cross-correlation values in a predetermined period may be calculated. The peaks of the cross-correlation values may be detected as the header positions of frames.

Moreover, a predetermined number of values corresponding to a predetermined number of frames in descending order of magnitudes from the maximum value may be detected as the peaks of the cross-correlation values.

Moreover, a frequency correction value of the reception signal and an initial phase of the reception signal may be calculated for respective predetermined time blocks as the parameters. In this case, the frequency of the reception signal may be corrected for the respective time blocks using the calculated frequency correction value, and the initial phase of the reception signal may be corrected using the calculated initial phase.

Further, a cross-correlation value indicating correlation between the reception signal and the known synchronization pattern may be calculated for respective predetermined time blocks as the parameter. In this case, the respective frames of the corrected reception signal may be integrated using the calculated cross-correlation value as a weighting factor of the time block.

In the transmission signal, the phase of the carrier signal may be modulated according to binary phase-shift keying and the phase of the carrier signal may be modulated according to quadrature phase-shift keying.

Moreover, the unknown portion of the transmission data may include transmission target information and a cyclic redundancy check code of the information, and an error in the transmission target information included in the transmission data may be determined using the cyclic redundancy check code.

<Receiver>

Figure 9:
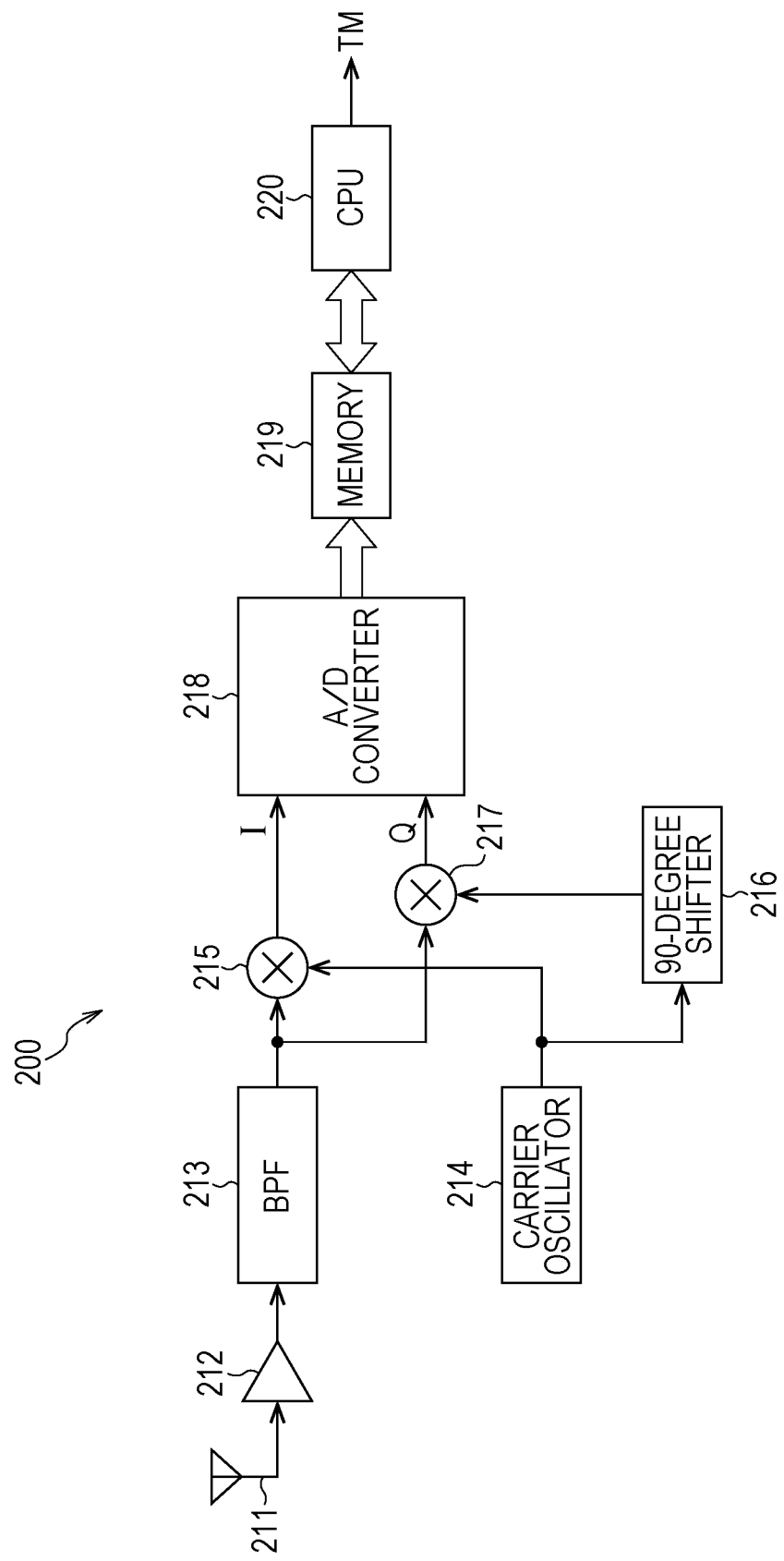
FIG. 9 is a block diagram illustrating an example of a main configuration of a receiver.

FIG. 9 is a diagram illustrating an example of a main configuration of a receiver which is an example of a signal processing device to which the present technology is applied. A receiver 200 illustrated in FIG. 9 is a device that receives and demodulates the transmission signal TX transmitted from the transmitter 100 of FIG. 5 to obtain meteorological observation data (observation data such as, for example, temperature, sunshine, precipitation, and the direction and velocity of wind), or the like, for example. The receiver 200 is installed in an urban area (for example, in facilities such as a university research facility or a data center) at the foot of a mountain, for example, so as to receive a radio signal (that is, a radio signal transmitted from a long distance) transmitted from the transmitter 100 installed in a mountain area or the like.

As illustrated in FIG. 9, the receiver 200 includes an antenna 211, a low-noise amplifier 212, a band-pass filter (BPF) 213, a carrier oscillator 214, a multiplier 215, a 90-degree shifter 216, a multiplier 217, an A/D converter 218, a memory 219, and a CPU 220.

The low-noise amplifier 212 receives the radio signal (transmission signal TX) via the antenna 211, amplifies the reception signal, and supplies the reception signal to the band-pass filter 213.

The band-pass filter 213 removes unnecessary frequency components from the reception signal and supplies the reception signal to the multipliers 215 and 217.

The carrier oscillator 214 generates a signal having a predetermined carrier frequency to be used for signal transmission and reception. For example, when a signal transmitted in the 920 MHz band is to be received, the carrier oscillator 214 oscillates at a frequency of 920 MHz. The carrier oscillator 214 supplies the oscillation signal (carrier signal) to the multiplier 215 and the 90-degree shifter 216.

The multiplier 215 multiplies the reception signal supplied from the band-pass filter 213 and the carrier signal supplied from the carrier oscillator 214 to generate an In-phase signal (I-signal) of the baseband. The multiplier 215 supplies the I-signal to the A/D converter 218.

The 90-degree shifter 216 shifts the phase of the carrier signal supplied from the carrier oscillator 214 by 90°. The 90-degree shifter 216 supplies the phase-shifted carrier signal to the multiplier 217.

The multiplier 217 multiplies the reception signal supplied from the band-pass filter 213 and the carrier signal of which the phase is shifted by 90°, supplied from the 90-degree shifter 216 to generate a quadrature signal (Q-signal) of the baseband. The multiplier 215 supplies the Q-signal to the A/D converter 218.

The A/D converter 218 performs A/D conversion the supplied analog I and Q-signals to digital data, respectively, supplies the digital data to the memory 219, and stores the same in the memory 219. The conversion rate of the A/D converter 218 needs to exceed the chip-rate used for transmitting signals. For example, when signals are transmitted with the chip-rate of 200 K/s and Δ of 5 μs, the A/D converter 218 needs to perform A/D conversion with a conversion rate of at least 200 KHz.

The memory 219 has a predetermined storage medium, acquires the digital data of the I and Q-signals supplied from the A/D converter 218, and stores the digital data in the storage medium. This storage medium may be an optional medium, and for example, may be a semiconductor memory, a magnetic recording medium such as a hard disk, and the other storage media. When the A/D converter 218 performs A/D conversion for 30 seconds with 8-bit precision and 2× conversion rate (400 KHz), digital data of the I and Q-signals of 24 Mbyte is stored in the memory 219.

The CPU 220 reads the digital data of the I and Q-signals stored in the memory 219 and decodes the digital data to reconstruct the meteorological observation data TM. The CPU 220 outputs the reconstructed meteorological observation data TM.

By doing so, the receiver 200 can receive and decode the transmission signal transmitted by the transmitter 100. That is, the receiver 200 can receive the transmission frame transmitted as frames of 0.2 seconds or shorter, in which the known synchronization pattern (SYNC) is spread substantially uniformly, and decode the transmission frame correctly to obtain the meteorological observation data TM. Thus, the receiver 200 can suppress a decrease in the receiver sensitivity.

In other words, the receiver 200 can transmit radio signals to a farther distance while suppressing an increase in power consumption of the entire device. Thus, when this receiver 200 is employed, a system for transmitting meteorological observation data obtained by the meteorological observation device 31 installed in a place such as a mountain area, for example, where it is difficult for a person to observe the meteorological data by himself or herself and where it is difficult to prepare a large external power supply to an urban area (for example, in facilities such as a university research facility or a data center) at the foot of a mountain, for example can be realized more easily.

<Flow of Receiving Process>

Next, an example of the flow of a receiving process executed by the receiver 200 having the above-described configuration will be described with reference to the flowchart of FIG. 10.

When a receiving process starts, the low-noise amplifier 212 of the receiver 200 receives a radio signal (transmission signal TX) via the antenna 211 in step S201.

In step S202, the low-noise amplifier 212 amplifies a reception signal which is the radio signal received in step S201.

In step S203, the band-pass filter 213 removes unnecessary frequency components from the reception signal amplified in step S202.

In step S204, the carrier oscillator 214 oscillates at a predetermined frequency to generate a carrier signal.

In step S205, the multiplier 215 multiplies the carrier signal by the reception signal to generate the I-signal.

In step S206, the 90-degree shifter 216 shifts the phase of the carrier signal by 90°. The multiplier 217 multiplies the carrier signal of which the phase is shifted by 90° by the reception signal to generate the Q-signal.

In step S207, the A/D converter 218 performs A/D conversion on the I-signal generated in step S205 and the Q-signal generated in step S206.

In step S208, the memory 219 stores the digital data of the I-signal and the digital data of the Q-signal, generated in step S208.

In step S209, the CPU 220 reads the digital data of the I-signal and the digital data of the Q-signal from the memory 219 and performs a decoding arithmetic process on the digital data to decode the digital data.

The receiving process ends when the receiving process has been completed for all frames.

<Flow of Decoding Arithmetic Process>

Next, an example of the flow of the decoding arithmetic process executed in step S209 of FIG. 10 will be described with reference to the flowchart of FIG. 11.

When the decoding arithmetic process starts, the CPU 220 corrects the carrier frequency in step S221. The oscillation frequency of the carrier oscillator 214 may vary slightly depending on an ambient temperature. Thus, the CPU 220 measures the ambient temperature, predicts a slight variation in the carrier frequency, and corrects the carrier frequency.

For example, when a frequency variation estimated from the ambient temperature is ε, the CPU 220 performs the following operations of Formulae (1) and (2) to correct the frequency variation in the I and Q-signals.

[Math.1]
$$I'(t)=I(t) \times \cos(2\pi\varepsilon t)-Q(t) \times \sin(2\pi\varepsilon t) \quad (1)$$

[Math.2]
$$Q'(t)=I(t) \times \sin(2\pi\varepsilon t)+Q(t) \times \cos(2\pi\varepsilon t) \quad (2)$$

In Formula (1), I'(t) is a sample value at time t of the corrected I-signal. In Formula (2), Q'(t) is a sample value at time t of the corrected Q-signal.

In step S222, the CPU 220 executes a frame header position detecting process to detect 100 frame header positions.

In step S223, the CPU 220 slices the reception signal (I and Q-signals) corresponding to one frame from the frame header position detected in step S222. The number of the detected frame is set to n.

In step S224, the CPU 220 executes a parameter calculating process to calculate a correlation value ß(n) between the I and Q-signals sliced in step S223 and the synchronization signal (SYNC). Moreover, the CPU 220 calculates a frequency correction value γ(n) and an initial phase θ(n) that maximize the correlation value ß(n).

In step S225, the CPU 220 corrects the frequency and the initial phase of the reception signal using the frequency correction value γ(n) and the initial phase θ(n) calculated in step S224.

In step S226, the CPU 220 adds the reception signal corrected in step S225 to frame data. In this case, the CPU 220 applies weighting to the reception signal to be added using the correlation value ß(n) as a weighting factor.

In step S227, the CPU 220 determines whether the above processes have been completed for 100 frames. When it is determined that a non-processed frame is present, the flow returns to step S222 and the subsequent processes are performed repeatedly. The respective processes of steps S222 to S227 are executed for each frame, and when it is determined in step S227 that all frames have been processed, the flow proceeds to step S228.

In step S228, the CPU 220 performs a decoding process by multiplying a Gold code by the added frame data and integrating the frame data to despread the frame data and reconstructs the meteorological observation data TM.

In step S229, the CPU 220 performs an error determination process by performing a CRC operation.

In step S230, the CPU 220 outputs the meteorological observation data TM as decoded data unless an error is detected in the error determination process of step S229.

Figure 10:
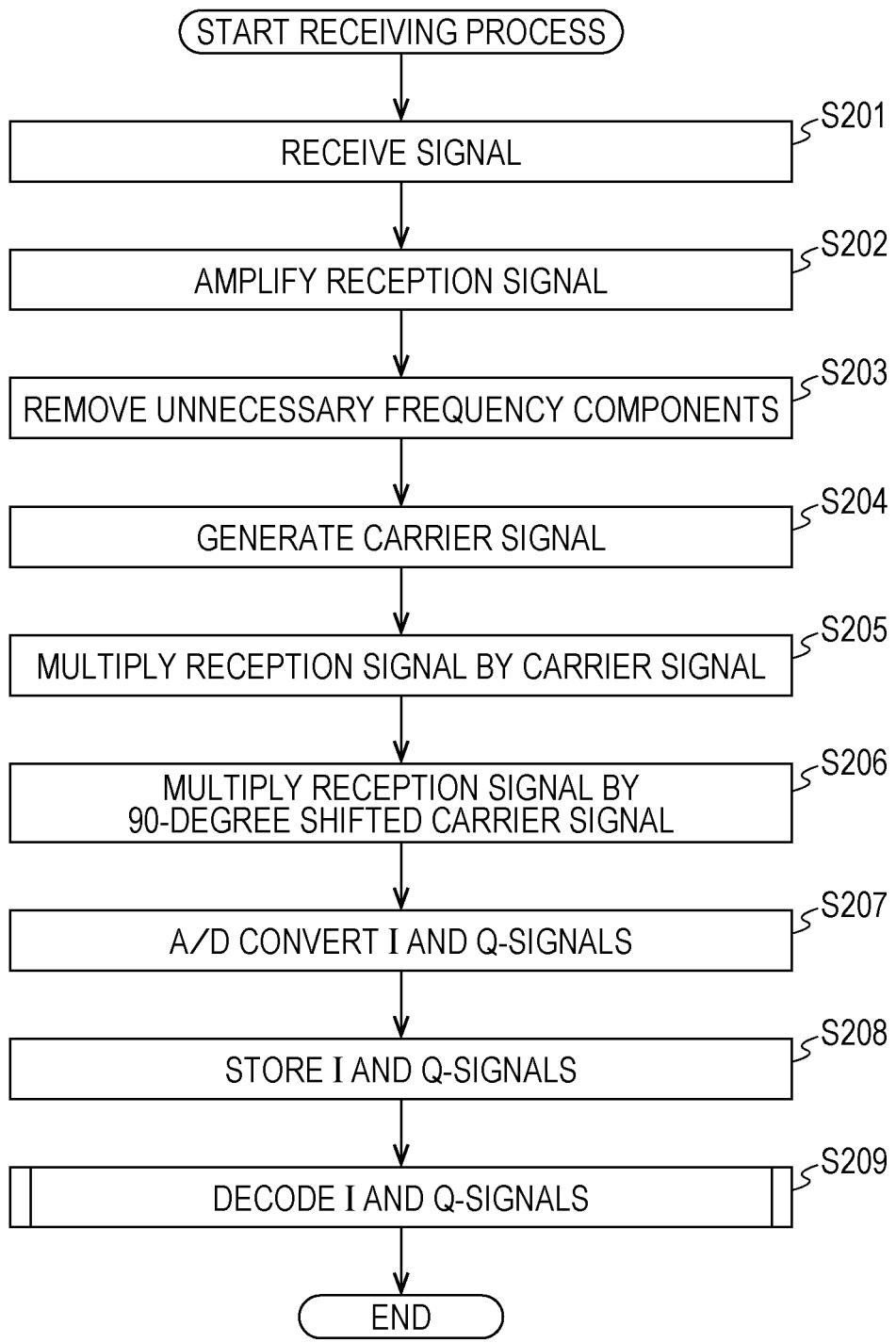
FIG. 10 is a flowchart for describing an example of the flow of a receiving process.

When the process of step S230 ends, the decoding arithmetic process ends and the flow returns to FIG. 10.

<Flow of Frame Header Position Detecting Process>

Next, an example of the flow of a frame position detection process executed in step S222 of FIG. 11 will be described with reference to the flowchart of FIG. 12.

Here, when a reception signal level is low, the transmitted signal is embedded in noise, and it is difficult to find a frame header position according to the conventional method. Thus, the CPU 220 detects the frame header position using the known synchronization pattern (SYNC) that is spread over the entire frame.

When the frame position detecting process starts, the CPU 220 creates a known synchronization waveform in which the synchronization pattern (SYNC) is removed in step S251. That is, the CPU 220 replaces the bits "0" and "1" corresponding to the synchronization pattern (SYNC) of the transmission data QD with "+1" and "−1," respectively. Moreover, the CPU 220 changes all bits corresponding to the UND of the transmission data QD to zero.

In step S252, the CPU 220 multiplies the Gold code to create a known spreading code ref(t,n).

In step S253, the CPU 220 performs fast Fourier transform (FFT) on the known spreading code ref(t,n) to obtain R(k,n).

In step S254, the CPU 220 performs fast Fourier transform on the I and Q-signals (I'(t), Q'(t)) to obtain a complex reception signal spectrum S(k). Here, both R(k) and S(k) are complex spectra.

In step S255, the CPU 220 sets a slight frequency shift ζ and multiplies the complex spectrum by the frequency shift to obtain a cross-correlation value c(t,ζ). This total correlation value is obtained using inverse fast Fourier transform (IFFT) as in Formula (3) below.

[Math.3]
$$C(t,\zeta)=\text{IFFT}\{R(k\cdot\zeta)\cdot S^*(k)\} \quad (3)$$

S*(k) is a complex conjugate component of S(k).

Here, the frequency shift ζ needs to be calculated using Formulae (1) and (2) described above, which incurs a considerably long period. However, the use of FFT and IFFT enables the calculation of the frequency shift to be replaced with a shift in a readout position of an arrangement. Thus, the calculation of Formula (3) is performed at a high speed. Moreover, S(k) is a signal that has passed through a band-pass filter. Thus, the result of the multiplication (R(k·ζ) and S*(k)) in Formula (3) becomes zero if the frequency is outside a predetermined limited frequency range. Thus, the calculation of Formula (3) can be executed at a high speed.

Thus, by using fast Fourier transform (FFT) and inverse fast Fourier transform (IFFT), the CPU 220 can perform the correlation operation at a higher speed.

The slight frequency shift ζ may change depending on the frame header position. Thus, in step S256, the CPU 220 calculates a cross-correlation value α(t) at time t by adding the absolute value of c(t,ζ) while sequentially shifting the value of the slight shift ζ as in Formula (4) below.

[Math.4]
$$\alpha(t)=\Sigma_{\zeta=-\gamma}^{+\gamma}|c(t,\zeta)|^2 \quad (4)$$

Figure 13:
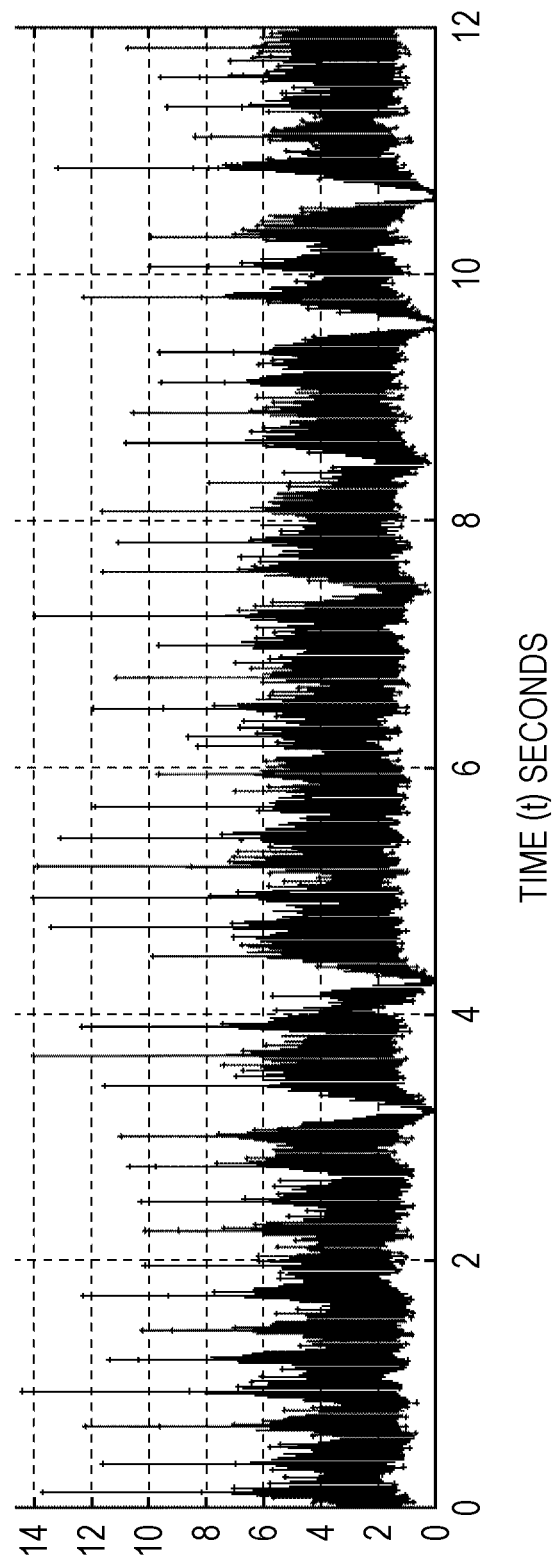
FIG. 13 is a diagram illustrating an example of the plot of a cross-correlation value $\alpha(t)$.

FIG. 13 is a diagram illustrating an example of the plot of α(t) obtained by calculating in this manner. It can be understood that peaks occur substantially periodically (every 0.3 seconds) in the plotted period of 12 seconds. These peak positions are the header positions of frames. Moreover, it can be understood that the peak values are not constant but vary greatly with time. Various reasons such as fading or a phase rotation of a carrier oscillator of a transceiver can be thought of as the cause of such a variation.

FIG. 13 illustrates a plot example when the SNR is relatively satisfactory, and the peak position of α(t) can be identified easily. However, when communication electric field intensity is low, since the amplitude of α(t) decreases and is embedded in noise, it may be difficult to find the peak positions clearly unlike the example of FIG. 13.

In step S257, the CPU 220 detects the frame header position by executing a peak detecting process to find the peaks of the cross-correlation value α(t). Here, a cross-correlation value of an n-th frame is defined as ß(n). When the time at which α(t) reaches its peaks is tn, a relation between α(t) and ß(n) can be expressed as Formula (5) below.

[Math.5]

$$\text{ß}(n) = \alpha(tn) \quad (5)$$

Figure 14:
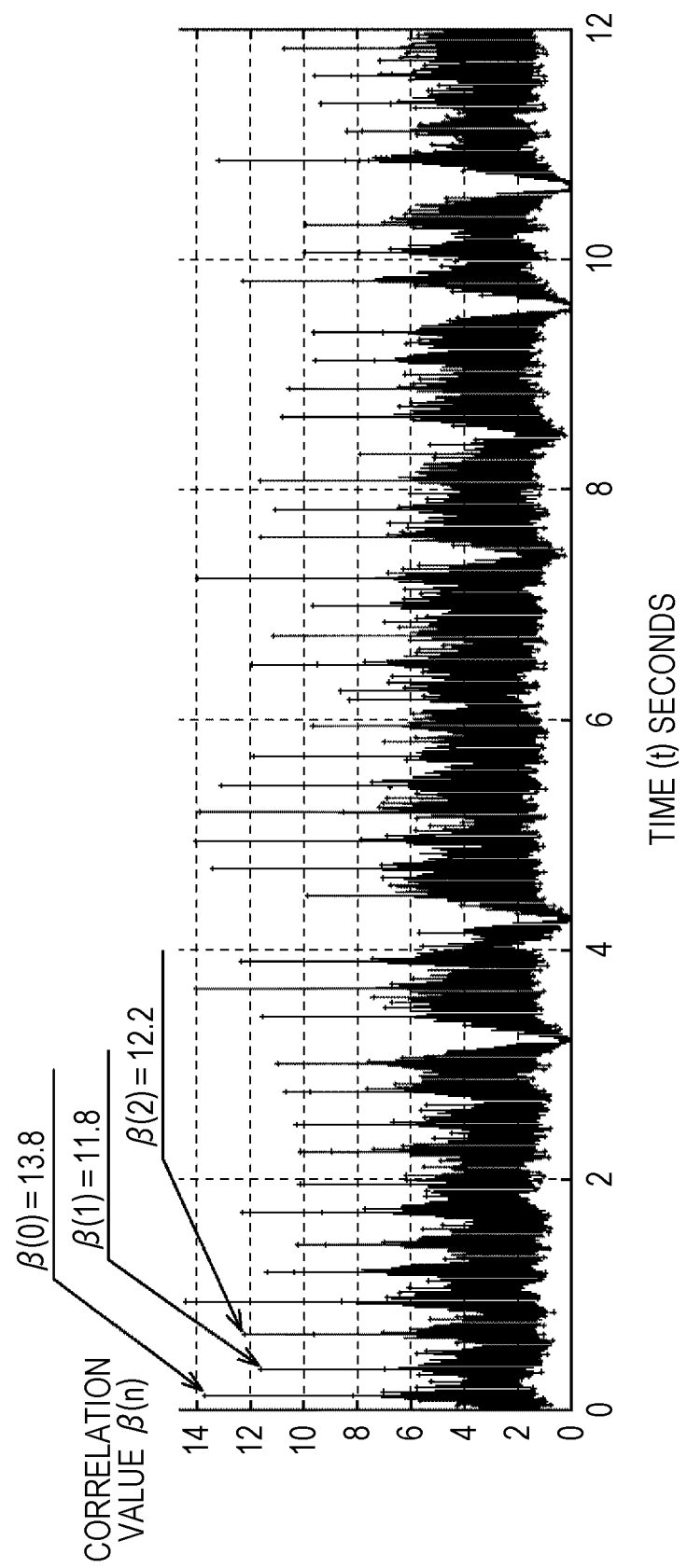
FIG. 14 is a diagram illustrating a cross-correlation value $\beta(n)$.

FIG. 14 is a diagram illustrating an example of the plot of ß(n) obtained by calculating in this manner. In the example of FIG. 14, the frame header positions are found approximately every 0.3 seconds. Moreover, peaks do not occur depending on the condition of radio waves (that is, the frame header positions are not found).

Figure 11:
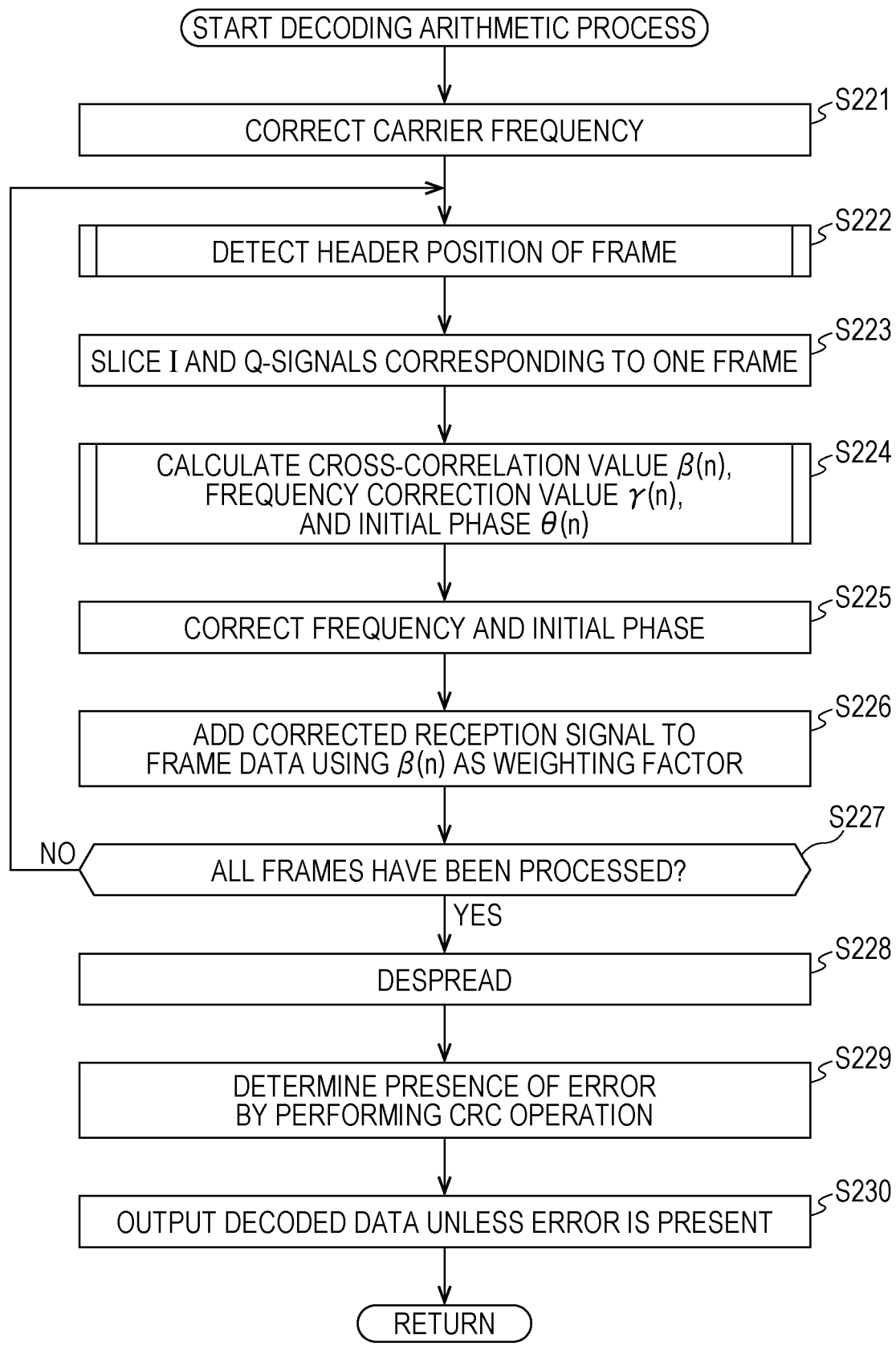
FIG. 11 is a flowchart for describing an example of the flow of a decoding arithmetic process.

When the process of step S257 ends, the frame header position detecting process ends and the flow returns to FIG. 11.

<Flow of Peak Detecting Process>

Figure 15:
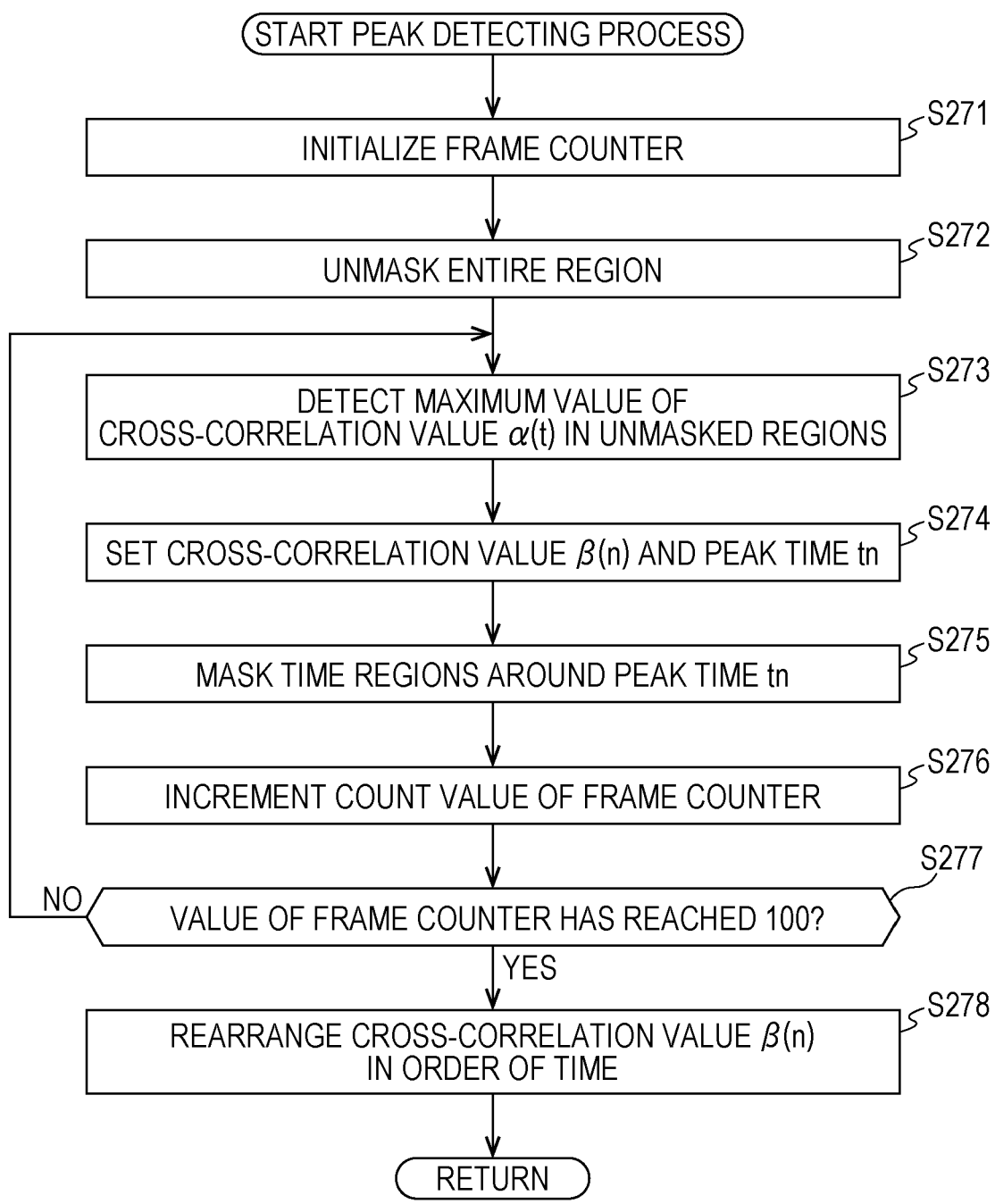
FIG. 15 is a flowchart for describing an example of the flow of a peak detecting process.
Figure 16:
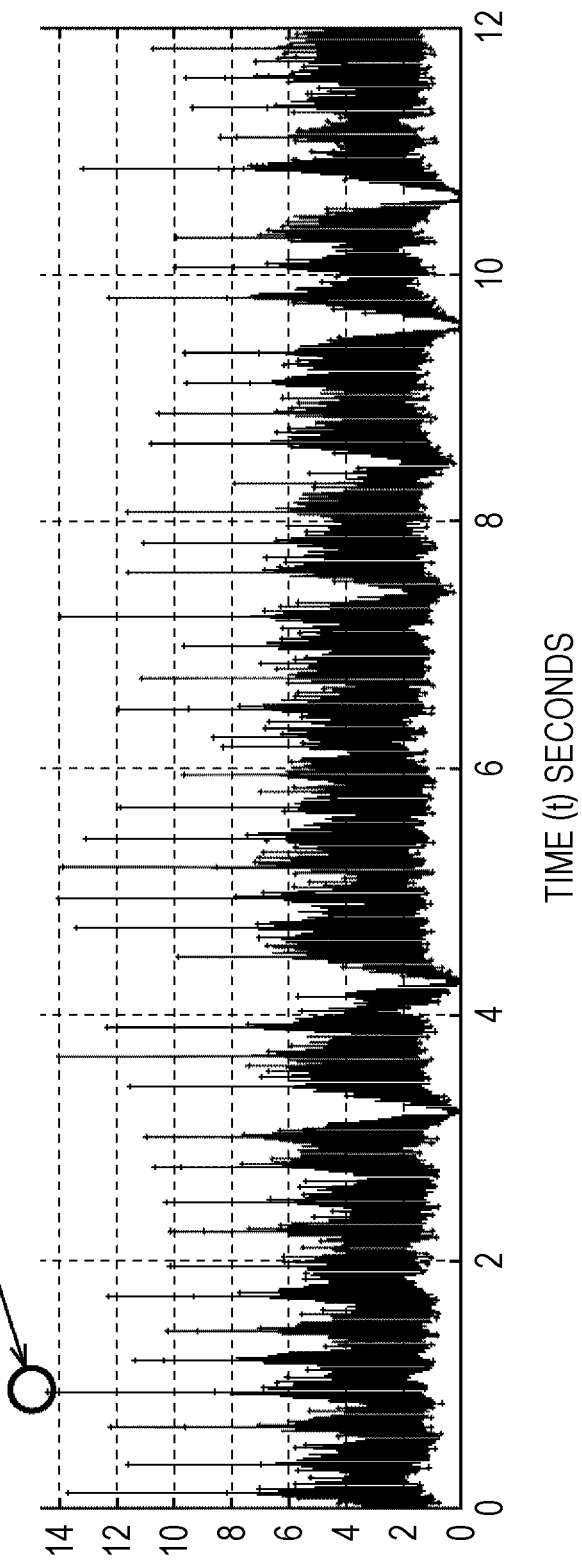
FIG. 16 is a diagram for describing an example of how peaks are detected.

Next, an example of the flow of a peak detecting process executed in step S257 of FIG. 12 will be described with reference to the flowchart of FIG. 15.

When the peak detecting process starts, the CPU 220 initializes the value of the frame counter n to zero in step S271.

In step S272, the CPU 220 unmasks the entire time region of 30 seconds. A masking region is a time region in which peak detection described later is not performed.

Figure 17:
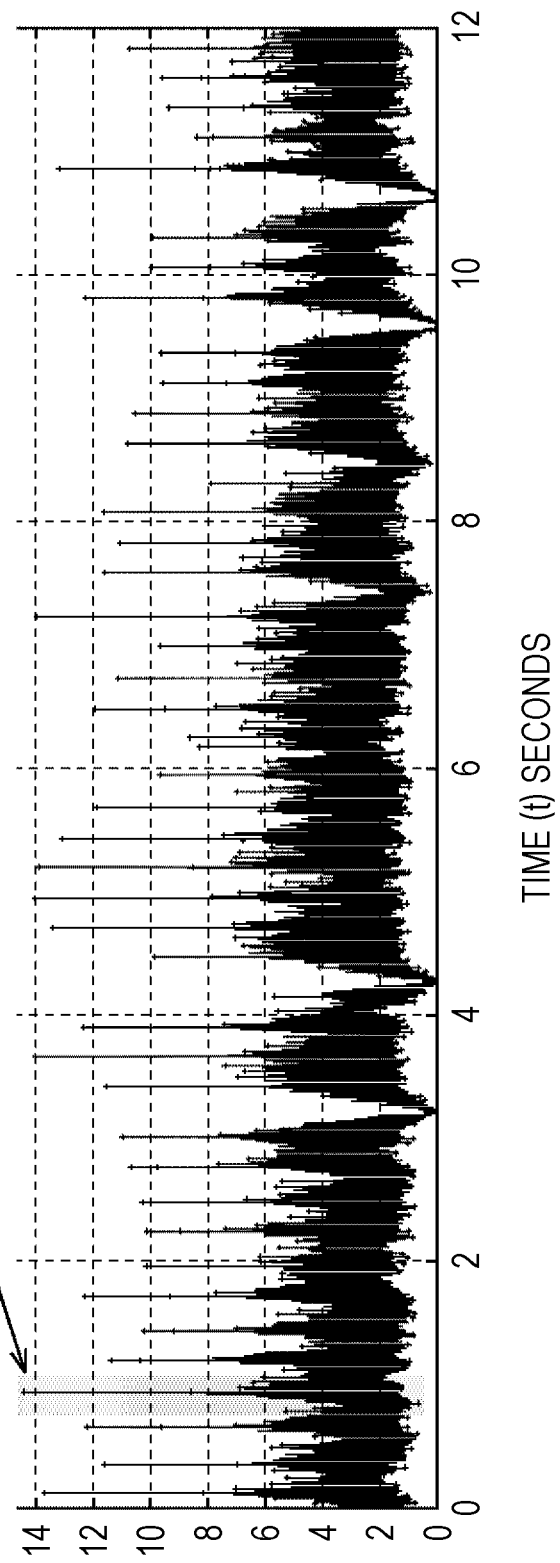
FIG. 17 is a diagram for describing an example of how peaks are detected.

In step S273, the CPU 220 detects a maximum value of the cross-correlation value α(t) in the entire time region which is not masked. FIG. 17 illustrates an example of how the maximum value is detected. The time at which the cross-correlation value α(t) reaches its maximum value is the time that is regarded as the header position of a frame.

Thus, in step S274, the CPU 220 stores that time as tn. Moreover, the CPU 220 stores the peaks of the correlation value by setting ß(n)=α(tn). That is, the CPU 220 sets the cross-correlation value ß(n) and the peak time tn.

If the detected peak position is the header position of a frame, another frame is not present in the period before and after 0.2 seconds.

Figure 18:
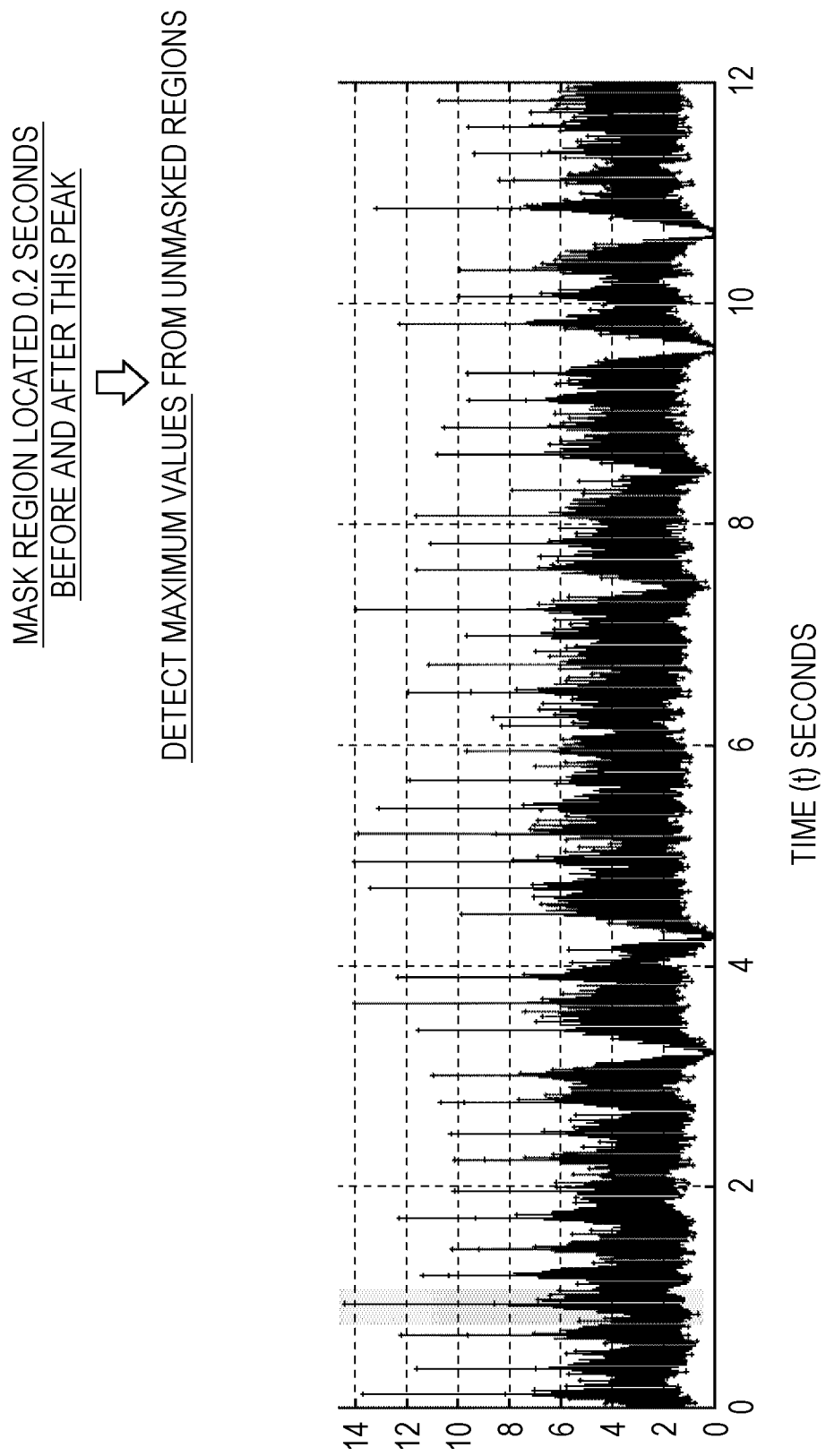
FIG. 18 is a diagram for describing an example of how peaks are detected.
Figure 19:
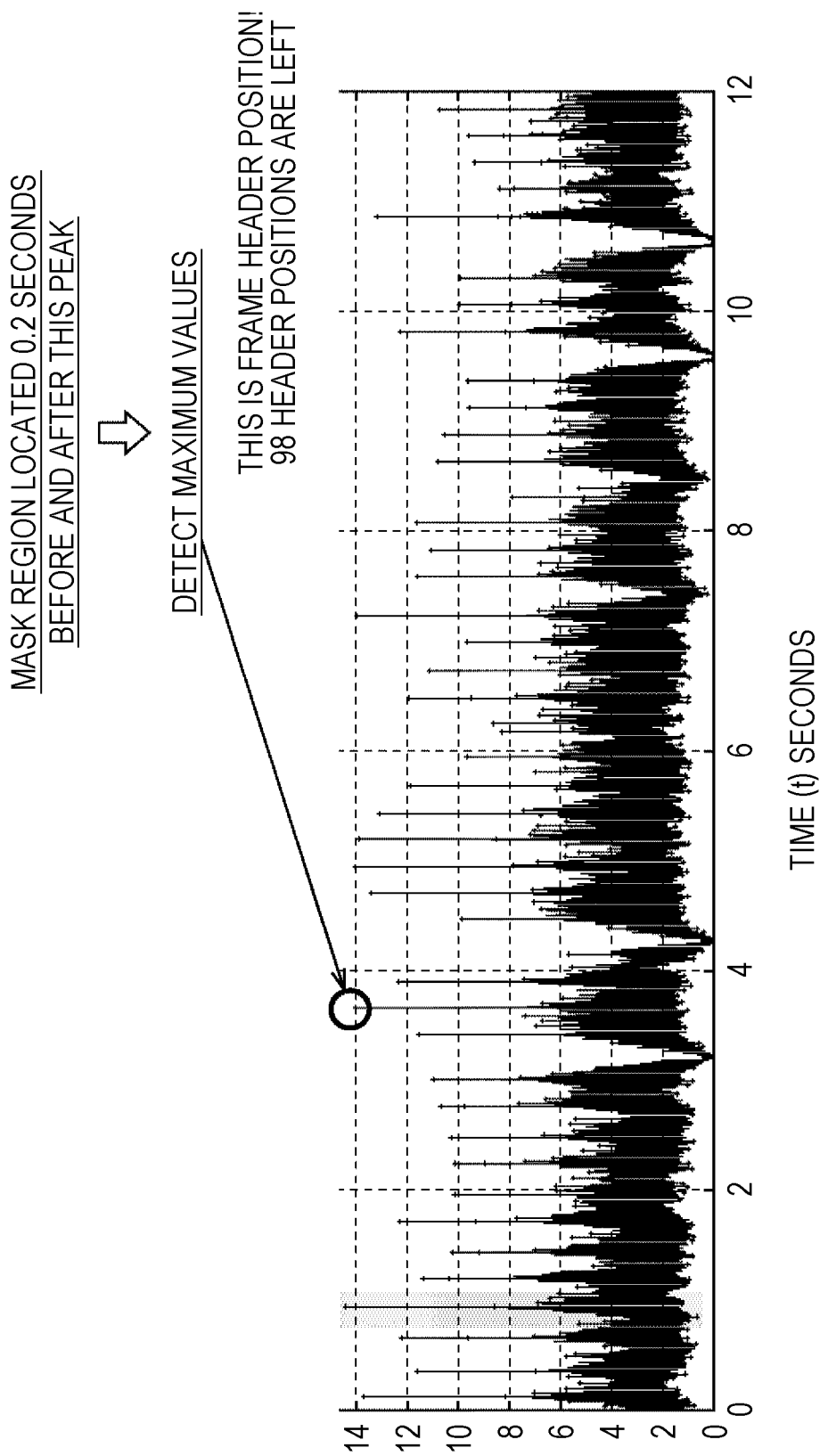
FIG. 19 is a diagram for describing an example of how peaks are detected.
Figure 20:
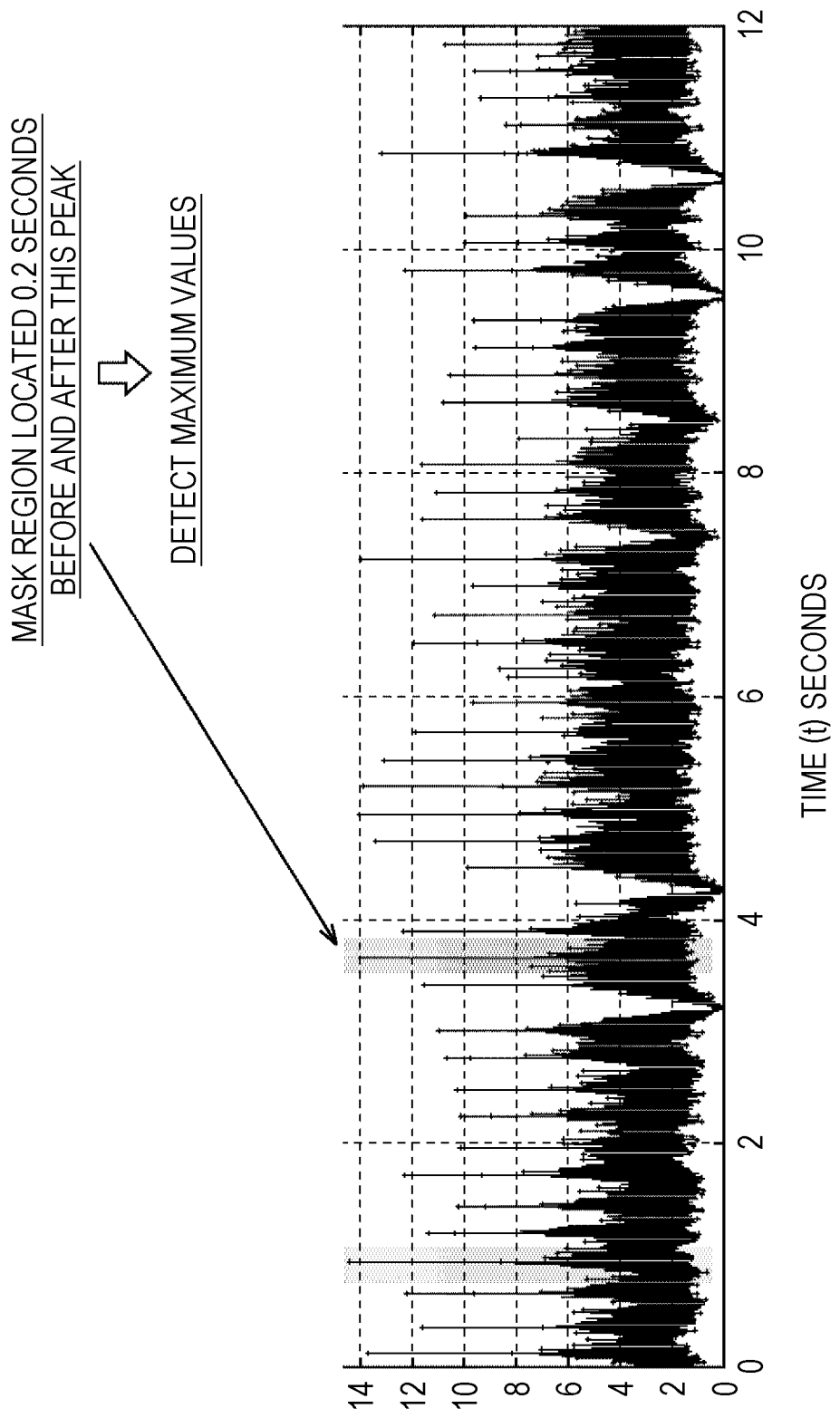
FIG. 20 is a diagram for describing an example of how peaks are detected.
Figure 21:
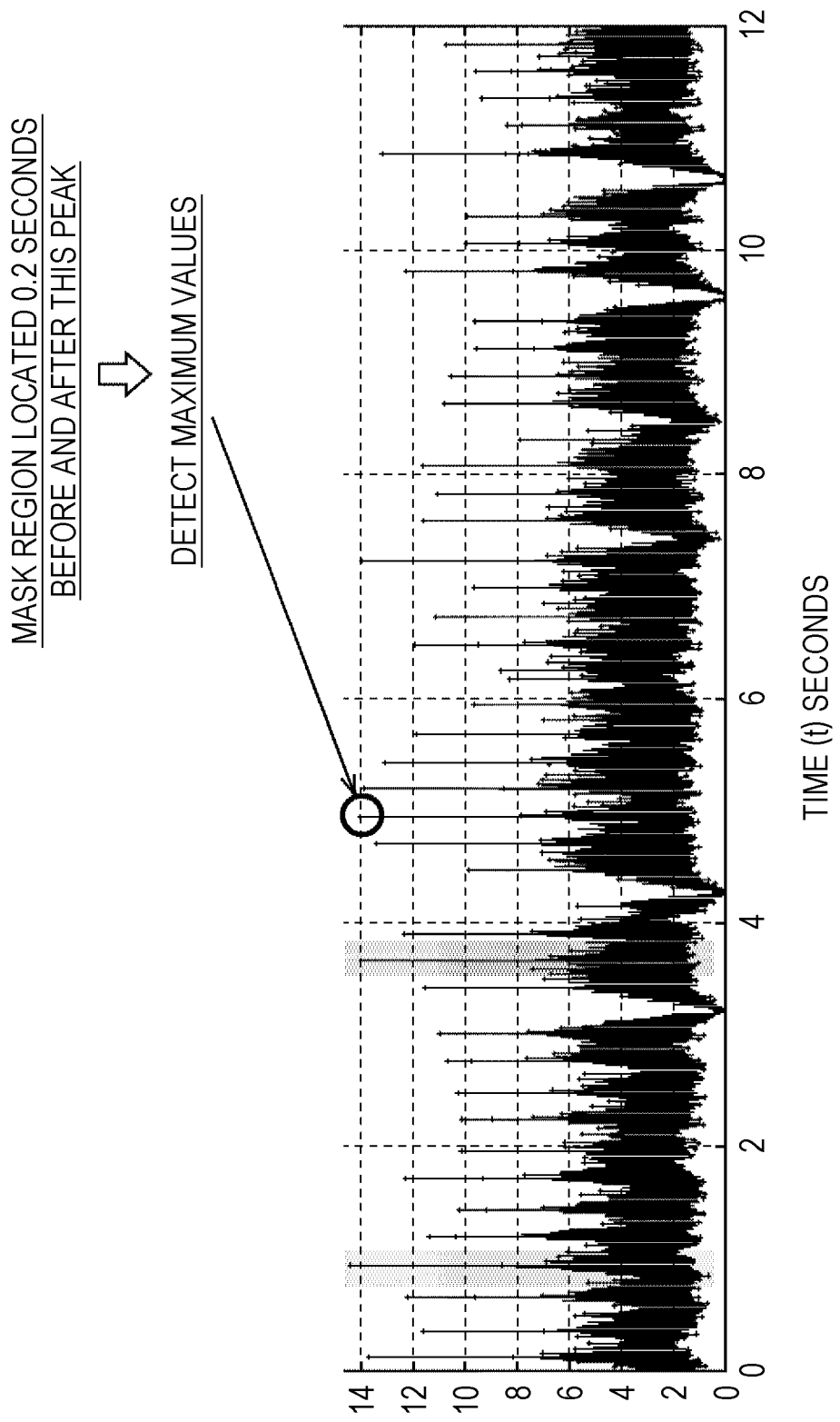
FIG. 21 is a diagram for describing an example of how peaks are detected.

In step S275, the CPU 220 masks a time region located 0.2 seconds before and after the peak detected in step S273. FIG. 18 illustrates an example of how the time region is masked.

Subsequently, in step S276, the CPU 220 updates the frame counter n by adding "1" to the value of the frame counter n.

In step S277, the CPU 220 determines whether the value of the frame counter has reached "100". That is, the CPU 220 determines whether the peak detecting process has been completed for all target frames.

When it is determined that the counted value has not reached 100 and the peak detecting process has not been completed for all target frames, the flow returns to step S273 and the subsequent processes are repeatedly performed. That is, the maximum values are detected. In this case, the time regions in which the frame header positions have been found are masked by the process of step S275. Thus, the CPU 220 detects the maximum value in a time region other than the masked time regions as illustrated in FIGS. 18 to 21.

When the maximum value detecting process is performed repeatedly and it is determined in step S277 that a predetermined number (100) of peaks have been found, the flow proceeds to step S278.

With the above-described process, the values stored in ß(n) are arranged in descending order of the peaks of α(tn). Thus, in step S278, the CPU 220 rearranges the values stored in ß(n) in the order of time at which peaks have occurred.

Figure 12:
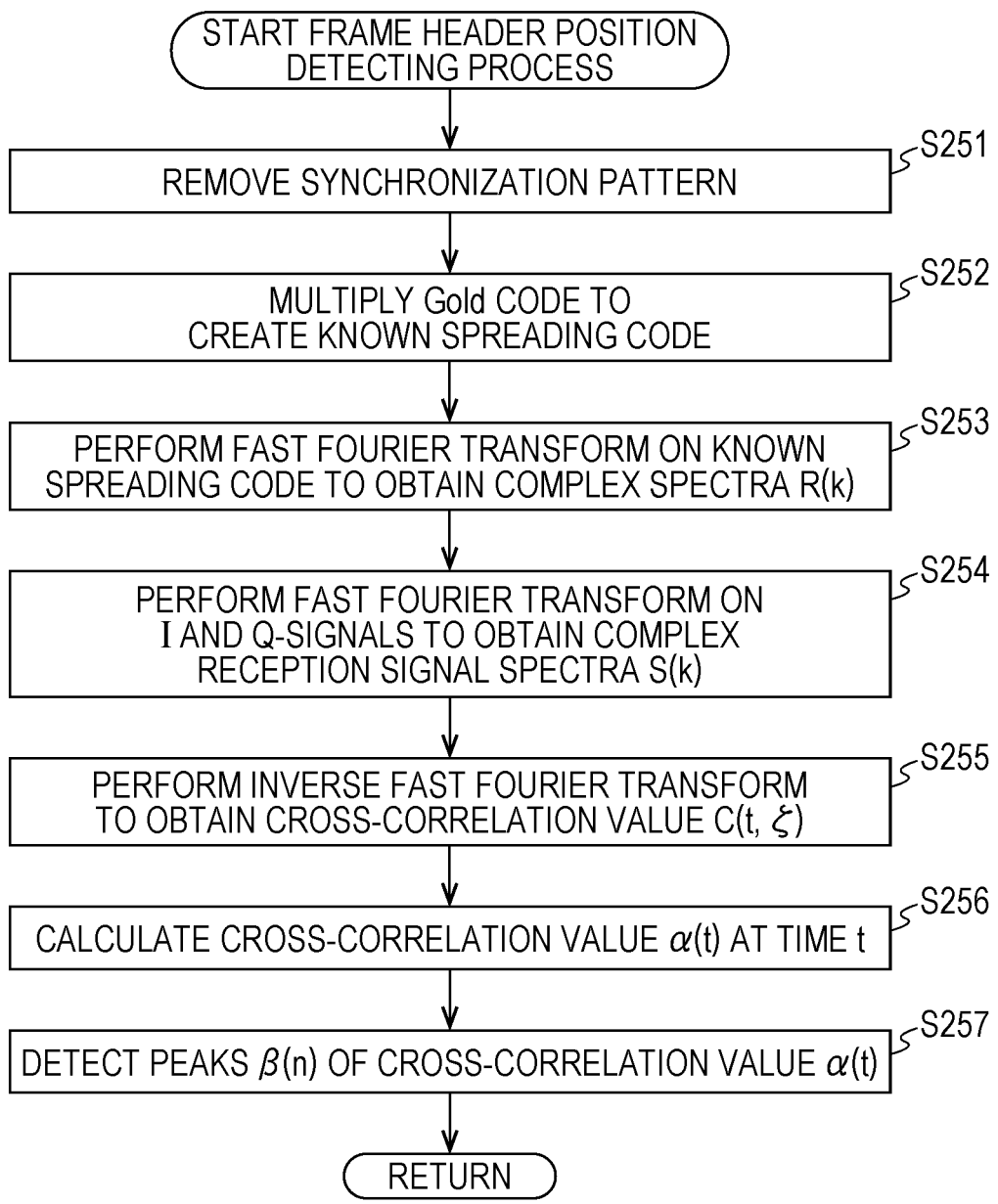
FIG. 12 is a flowchart for describing an example of the flow of a frame header position detecting process.

When the process of step S278 ends, the peak detecting process ends and the flow returns to FIG. 12.

In this manner, by finding the frame header positions in descending order of peaks, the CPU 220 can find the frame header positions more accurately even when the SNR is low.

<Flow of Parameter Calculating Process>

Figure 22:
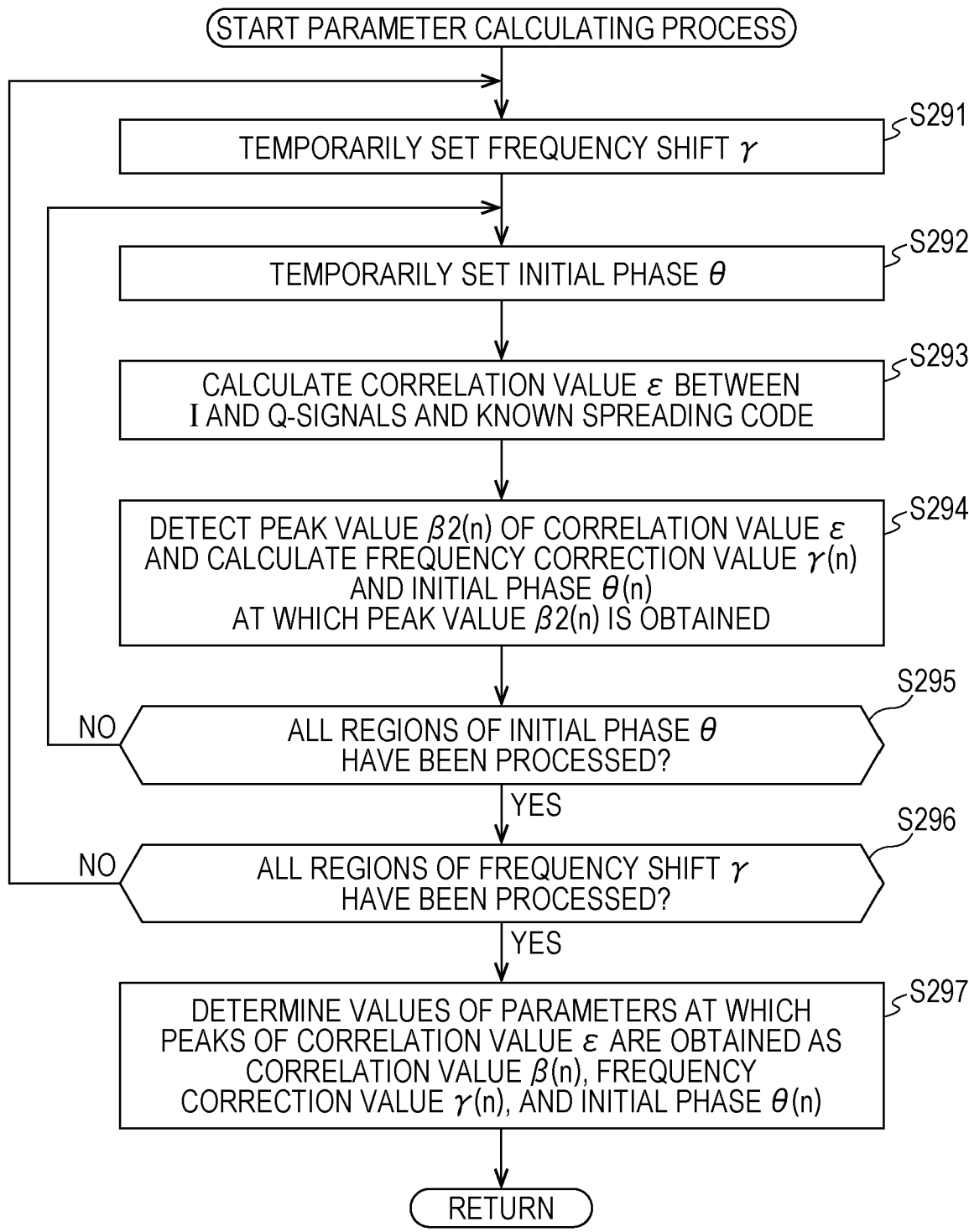
FIG. 22 is a flowchart illustrating an example of the flow of a parameter calculating process.

Next, an example of the flow of a parameter calculating process executed in step S224 of FIG. 11 will be described with reference to the flowchart of FIG. 22.

When the parameter calculating process starts, the CPU 220 temporarily sets the value of the frequency shift γ(n) with respect to the I and Q-signals sliced for each frame in step S291. For example, the CPU 220 sets the temporary value γ with a step of 5 Hz from −50 Hz to +50 Hz.

In step S292, the CPU 220 temporarily sets the value of the initial phase θ(n). For example, the CPU 220 sets the temporary value θ with a step of 20° from −180° to +160°.

In step S293, the CPU 220 calculates a correlation value ε(γ,θ) between the sliced I and Q-signals and a known spreading code ref(t,n) of the synchronization portion only based on the temporary frequency shift γ set in step S291 and the temporary initial phase θ set in step S292.

In step S294, the CPU 220 calculates the peak values of the correlation value ε(γ,θ) to obtain ß2(n). Moreover, the CPU 220 calculates the values of γ and θ at which the correlation value ε(γ,θ) reaches its peaks as a frequency correction value γ(n) and an initial phase θ(n).

In step S295, the CPU 220 determines whether the process has been performed for all regions of the initial phase θ. When it is determined that a non-processed region is present, the flow returns to step S292, and the subsequent processes are performed repeatedly. When the processes of steps S292 to S295 have been executed repeatedly and it is determined in step S295 that the process has been performed for all regions of the initial phase θ, the flow proceeds to step S296.

In step S296, the CPU 220 determines whether the process has been performed for all regions of the frequency shift γ. When it is determined that a non-processed region is present, the flow returns to step S291 and the subsequent processes are performed repeatedly. When the steps of steps S291 to S296 are executed repeatedly and it is determined in step S296 that the process has been performed for all regions of the frequency shift γ, the flow proceeds to step S297.

In step S297, the CPU 220 determines the values of the respective parameters at which the correlation value ε reaches its peaks as the correlation value ß(n), the frequency correction value γ(n), and the initial phase θ(n).

When the process of step S297 ends, the parameter calculating process ends, and the flow returns to FIG. 11.

The three values ß2(*n*), γ(n), and θ(n) obtained with the above-described process are values at which the correlation value between the signals and the known spreading code ref(t,n) amounts to its maximum.

Figure 23:
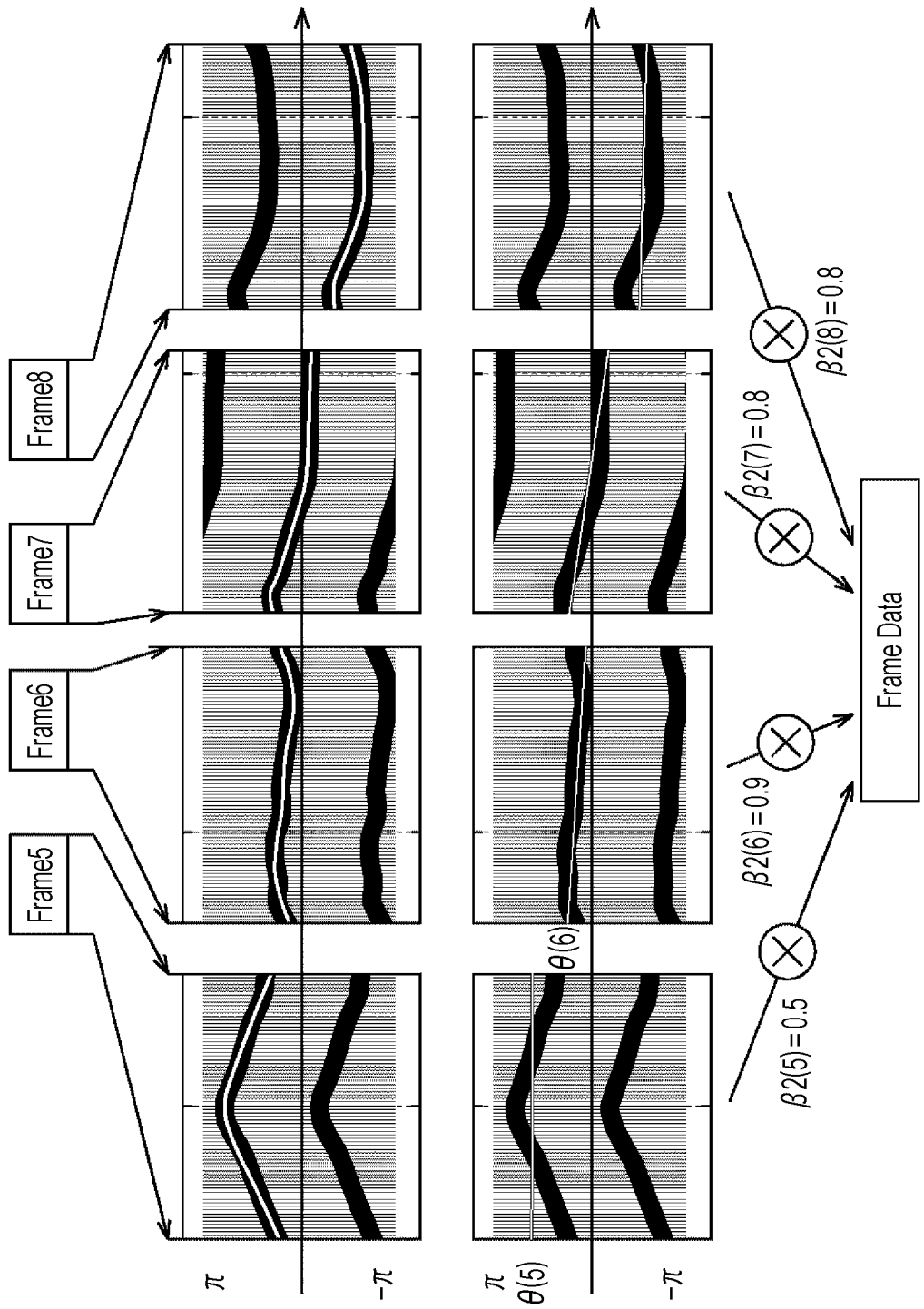
FIG. 23 is a diagram for describing an example of how a phase fluctuation is approximated.

The graphs on the upper side of FIG. 23 illustrate examples of a phase change in frames of 0.2 seconds, observed by experiments. In FIG. 23, although frames 5 to 8 are extracted and displayed, the phase and frequency thereof change slightly. The CPU 220 can obtain a straight line that best approximates the phase change as illustrated on the lower side of FIG. 23, in such a fluctuating phase by executing the parameter calculating process in the above-described manner.

In the graphs on the lower side of FIG. 23, an inclination of each of the straight lines corresponds to γ(n) and the initial phase corresponds to θ(n). Moreover, the correlation value ß2(*n*) changes with a correlation between the phase fluctuation and the approximated straight line.

The processes of the respective steps can be executed in an optional order and may be executed in parallel, and may be executed repeatedly as necessary.

As described above, by using the transmitter 100 or the receiver 200, it is possible to shorten the maximum continuous transmission duration. For example, when the maximum continuous transmission duration is set to 0.2 seconds in the 920 MHz band, since data can be transmitted while selecting a frequency channel from many frequency channels, it is possible to construct a transceiver system that is more robust against interference. Moreover, by integrating a number of short frames, it is possible to improve the effective SNR without exceeding the maximum transmission duration defined by the Wireless Radio Act. In this case, since the synchronization signal is spread over the entire frame, it is possible to correct the phase and frequency more appropriately even when a phase fluctuation occurs in a frame. As a result, the receiver 200 can decode a weak reception signal that is difficult to decode with the conventional method because the signal is embedded in noise, for example, more correctly.

Moreover, when a plurality of frames are integrated, the frames are integrated while multiplying the correlation coefficient ß(n) as a weighting factor. Thus, even when some frames are lost, a large phase fluctuation occurs in some frames, or an error is detected in some frames, since the value of the correlation coefficient ß(n) decreases, the receiver 200 can alleviate the influence to decode data more correctly.

Figure 24:
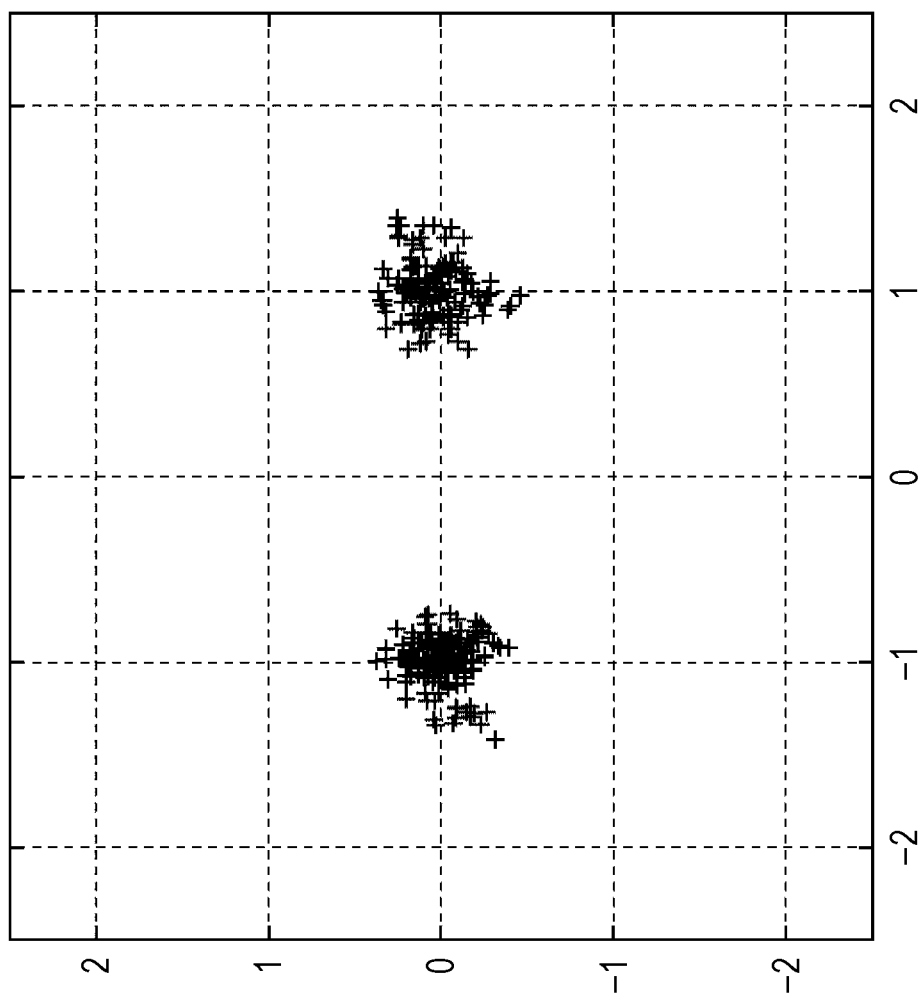
FIG. 24 is a diagram illustrating decoding results.

FIG. 24 illustrates a constellation of the decoding results of data transmitted and received by the transmitter 100 and the receiver 200 to which the present technology is applied. As illustrated in FIG. 24, since two points are separated according to the BPSK modulation, this means that data has been decoded correctly.

Although an example of transmitting frames of 0.2 seconds 100 times for 30 seconds has been described, these values are examples and the present technology is not limited to this example. For example, the number of frames transmitted may be changed as necessary. Moreover, the receiver 200 may return ACK information (acknowledge information) to the transmitter 100 and may stop transmitting frames when the ACK information is returned.

Moreover, although it has been described that the transmission signals transmitted in 100 frames are the same, the present technology is not limited to this example. For example, when it is possible to specify the frame number in transmission and reception, the Gold sequence (spreading sequence) may be changed every frame number.

Moreover, although it has been described that all of the 100 frames transmitted are detected, the present technology is not limited to this. For example, 98 frames may be detected among 100 frames by taking the influence of noise into consideration.

Although it has been described that the radio signal (transmission signal TX) received by the receiver 200 is modulated according to the BPSK modulation, a phase shift amount is optional and the present technology is not limited to this. For example, the radio signal may be modulated according to QPSK (quadrature phase-shift keying) modulation. In this case, the receiver 200 may generate the same pseudo-random number sequence as the transmitter 100 and may decode the radio signal using the pseudo-random number sequence.

The data received by the receiver 200 is optional and is not limited to the meteorological observation data. That is, the receiver 200 can be applied to an optional system and can be applied to a system other than the system that observes the meteorological data.

Further, although it has been described that the receiver 200 receives the transmission signal TX as a radio signal, the receiver 200 may receive the transmission signal TX transmitted via an optional cable communication medium.

3. Third Embodiment

<Computer>

The above-described series of processes may be executed by a hardware or may be executed by a software. When the series of processes is executed by the software, a program constituting the software is installed in a computer. Examples of the computer include a computer integrated into exclusive hardware and a general-personal computer, for example, which can execute various functions by installing various programs.

Figure 25:
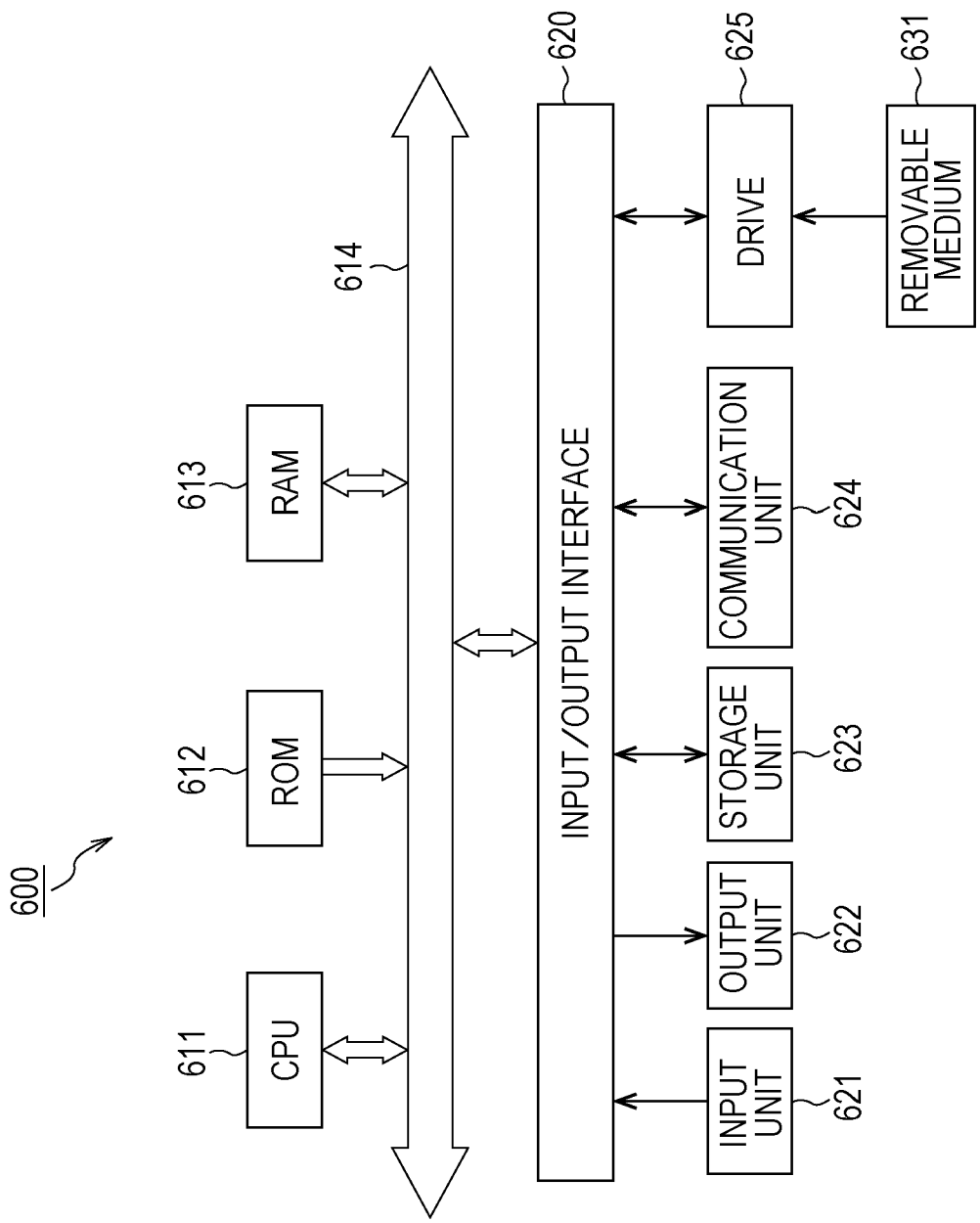
FIG. 25 is a block diagram illustrating an example of a main configuration of a computer.

FIG. 25 is a block diagram illustrating an exemplary hardware configuration of a computer executing the above-described series of processing by a program.

In the computer 600 illustrated in FIG. 25, a central processing unit (CPU) 611, a read only memory (ROM) 612, and a random access memory (RAM) 613 are connected to each other via a bus 614.

An input/output interface 620 is also connected to the bus 614. The input/output interface 620 is connected to an input unit 621, an output unit 622, a storage unit 623, a communication unit 624, and a drive 625.

The input unit 621 includes a keyboard, a mouse, a microphone, a touch panel, an input terminal, and the like, for example. The output unit 622 includes a display, a speaker, an output terminal, and the like, for example. The storage unit 623 includes a hard disk, a RAM disk, a nonvolatile memory, and the like, for example. The communication unit 624 includes a network interface, for example. The drive 625 drives a removable medium 631 such as a magnetic disc, an optical disc, a magneto-optical disc, or a semiconductor memory.

In the computer having such a configuration, the CPU 611 loads the program stored in the storage unit 623, for example, into the RAM 613 via the input/output interface 620 and the bus 614 and executes the program, whereby the above-described series of processes are executed. Data and the like necessary for the CPU 611 to execute various processes are also stored in the RAM 613 appropriately.

The program executed by the computer (the CPU 611) can be provided by being recorded on the removable medium 631 as a package medium or the like, for example. In this case, the program can be installed into the storage unit 623 via the input/output interface 620 by attaching the removable medium 631 to the drive 625.

Moreover, the program may be provided via cable or wireless transmission media such as a local area network, the Internet, digital satellite broadcasting. In this case, the program can be received by the communication unit 624 and be installed in the storage unit 623.

In addition, the program may be installed in advance in the ROM 612 or the storage unit 623.

The program executed by the computer may be a program executing processing in a time-sequential manner in accordance with the procedures described in this specification and may be a program executing the processing in a parallel manner or at necessary times such as in response to calls.

Here, in this specification, the steps that describe the program recorded in the recording medium includes not only processing which is executed in time-sequential manner in accordance with described procedures but also processing which is executed in parallel and/or separately even if it is not necessarily executed in time-sequential manner.

Moreover, the processes of the respective steps may be executed in the respective devices or an optional device other than the respective devices. In this case, the device that executes the process may have a function (functional block or the like) necessary for executing the process. Moreover, information necessary for the process may be transmitted to the device appropriately.

A system referred to in this specification means a set of a plurality of constituent elements (devices, modules (components), and the like) and is not limited to a configuration in which all constituent elements are disposed in the same housing. Thus, a plurality of devices which are accommodated in separate housings and are connected via a network and one device in which a plurality of modules are accommodated in one housing are also a system.

In the above description, the configuration described as one apparatus (or processor) may be split into a plurality of apparatuses (or processors). Alternatively, the configuration described as a plurality of apparatuses (or processors) may be integrated into a single apparatus (or processor). Moreover, a configuration other than those discussed above may be included in the above-described configuration of each apparatus (or each processor). If the configuration and the operation of a system as a whole is substantially the same, part of the configuration of an apparatus (or processor) may be added to the configuration of another apparatus (or another processor).

While preferred embodiments of the present disclosure have been described in detail with reference to the accompanying drawings, the present disclosure is not limited to the embodiments. Those skilled in the art will readily appreciate that various modifications and changes may be made in the embodiment without departing from the technical spirit as described in the claims. Accordingly, all such modifications and changes are intended to be included within the scope of the present disclosure as defined in the claims.

For example, the present technique can be embodied in a cloud computing structure in which one function is shared among a plurality of devices via a network, and processing is performed by the plurality of devices in cooperation.

The respective steps described with reference to the flowcharts can be executed by one device and may be shared by a plurality of devices.

Further, when one step includes a plurality of processes, the plurality of processes included in one step may be executed by one device and may be shared by a plurality of devices.

The present technology is not limited thereto. For example, the present technology can also be implemented as any configuration mounted on such a device or a device that constitutes such a system, such as, for example, a processor serving as system large scale integration (LSI) or the like, a module which uses a plurality of processors or the like, a unit which uses a plurality of modules or the like, a set in which other functions are further added to the unit, or the like (that is, a configuration of part of the device).

The present technology may be configured as below.

(1) A signal processing device including:

a rearranging unit that rearranges transmission data so that a portion that is known to a receiver side of the transmission data is spread more uniformly in the transmission data;

a modulating unit that modulates a phase of a carrier signal using the transmission data rearranged by the rearranging unit; and a transmitting unit that transmits a transmission signal which is the carrier signal of which the phase is modulated by the modulating unit.

(2) The signal processing device according to (1), wherein the rearranging unit divides the portion that is known to the receiver side of the transmission data and a portion that is unknown to the receiver side of the transmission data into a plurality of parts and rearranges the transmission data so that respective items of partial data of the divided known portions and respective items of partial data of the divided unknown portions are arranged alternately.

(3) The signal processing device according to (2), wherein the transmission data includes a portion of 13 octets that is known to the receiver side and a portion of 6 octets that is unknown to the receiver side, the rearranging unit divides the portion that is known to the receiver side every two octets and divides the portion that is unknown to the receiver side every octet and rearranges the transmission data so that the partial data of the known portions of two octets and the partial data of the unknown portions of one octet are arranged alternately.

(4) The signal processing device according to any of (1) to (3), wherein the portion that is unknown to the receiver side of the transmission data includes transmission target information and the portion that is known to the receiver side of the transmission data includes a predetermined synchronization pattern that is appended to the transmission target information.

(5) The signal processing device according to (4), wherein the portion that is unknown to the receiver side of the transmission data further includes a cyclic redundancy check code of the transmission target information.

(6) The signal processing device according to any of (1) to (5), wherein the modulating unit modulates the phase of the carrier signal according to binary phase-shift keying modulation using the transmission data rearranged by the rearranging unit.

(7) The signal processing device according to any of (1) to (6), wherein the modulating unit modulates the phase of the carrier signal according to quadrature phase-shift keying modulation using the transmission data rearranged by the rearranging unit.

(8) The signal processing device according to any of (1) to (7), wherein the rearranging unit rearranges the same transmission data a plurality of number of times, the modulating unit modulates the phase of the carrier signal whenever the transmission data is rearranged by the rearranging unit, and the transmitting unit transmits the transmission signal whenever the phase of the carrier signal is modulated by the modulating unit.

(9) A signal processing method including:

rearranging transmission data so that a portion that is known to a receiver side of the transmission data is spread more uniformly in the transmission data;

modulating a phase of a carrier signal using the rearranged transmission data; and transmitting a transmission signal which is the carrier signal of which the phase is modulated.

(10) A program for causing a computer to function as:

a rearranging unit that rearranges transmission data so that a portion that is known to a receiver side of the transmission data is spread more uniformly in the transmission data;

a modulating unit that modulates a phase of a carrier signal using the transmission data rearranged by the rearranging unit; and a transmitting unit that transmits a transmission signal which is the carrier signal of which the phase is modulated by the modulating unit.

(11) A signal processing device including:

a receiving unit that receives a transmission signal for transmitting transmission data rearranged so that a known portion of the transmission data is spread more uniformly in the transmission data;

a detecting unit that detects a header position of each of frames of a reception signal which is the transmission signal received by the receiving unit;

a parameter calculating unit that calculates a predetermined parameter for respective frames of the reception signal, of which the header position is detected by the detecting unit;

a correcting unit that corrects the respective frames of the reception signal using the parameter calculated by the parameter calculating unit;

an integrating unit that integrates the respective frames of the reception signal corrected by the correcting unit; and a decoding unit that decodes the transmission data from the reception signal integrated by the integrating unit.

(12) The signal processing device according to (11), wherein the detecting unit is configured to:

extract a known synchronization pattern from the reception signal;

generate a known spreading code;

perform fast Fourier transform on the known spreading code to obtain complex spectra;

perform fast Fourier transform on the reception signal to obtain complex reception signal spectra;

perform inverse fast Fourier transform on the complex spectra and the complex reception signal spectra to obtain cross-correlation values;

calculate cross-correlation values in a predetermined period; and detect peaks of the cross-correlation values as the header positions of the frames.

(13) The signal processing device according to (12), wherein the detecting unit detects a predetermined number of values corresponding to a predetermined number of frames in descending order of magnitudes from a maximum value as the peaks of the cross-correlation values.

(14) The signal processing device according to any of (11) to (13), wherein the parameter calculating unit calculates a frequency correction value of the reception signal and an initial phase of the reception signal in respective predetermined time blocks as the parameter, and the correcting unit corrects a frequency of the reception signal using the frequency correction value calculated by the parameter calculating unit in the respective time blocks and corrects an initial phase of the reception signal using the initial phase calculated by the parameter calculating unit in the respective time blocks.

(15) The signal processing device according to any of (11) to (14), wherein the parameter calculating unit calculates a cross-correlation value indicating a correlation between the reception signal and a known synchronization pattern in respective predetermined time blocks as the parameter, and the integrating unit integrates the respective frames of the reception signal corrected by the correcting unit using the cross-correlation value calculated by the parameter calculating unit as a weighting factor of the time block.

(16) The signal processing device according to any of (11) to (15), wherein the transmission signal has a carrier signal of which the phase is modulated according to binary phase-shift keying modulation.

(17) The signal processing device according to any of (11) to (16), wherein the transmission signal has a carrier signal of which the phase is modulated according to quadrature phase-shift keying modulation.

(18) The signal processing device according to any of (11) to (17), wherein an unknown portion of the transmission data includes transmission target information and a cyclic redundancy check code of the information, and the decoding unit determines the presence of an error in the transmission target information included in the transmission data using the cyclic redundancy check code.

(19) A signal processing method including:

receiving a transmission signal for transmitting transmission data rearranged so that a known portion of the transmission data is spread more uniformly in the transmission data;

detecting a header position of each of frames of a reception signal which is the received transmission signal;

calculating a predetermined parameter for respective frames of the reception signal, of which the header position is detected;

correcting the respective frames of the reception signal using the calculated parameter;

integrating the corrected respective frames of the reception signal; and decoding the transmission data from the integrated reception signal.

(20) A program for causing a computer to function as:

a receiving unit that receives a transmission signal for transmitting transmission data rearranged so that a known portion of the transmission data is spread more uniformly in the transmission data;

a detecting unit that detects a header position of each of frames of a reception signal which is the transmission signal received by the receiving unit;

a parameter calculating unit that calculates a predetermined parameter for respective frames of the reception signal, of which the header position is detected by the detecting unit;

a correcting unit that corrects the respective frames of the reception signal using the parameter calculated by the parameter calculating unit; an integrating unit that integrates the respective frames of the reception signal corrected by the correcting unit; and a decoding unit that decodes the transmission data from the reception signal integrated by the integrating unit.

(21) A signal processing device comprising:
a rearranging unit that rearranges transmission data so that a predictable portion of the transmission data is spread more uniformly in the transmission data, the predictable portion including information that is predictable by a receiver side;
a modulating unit that generates a modulated signal by modulating a phase of a carrier signal based on the rearranged transmission data; and
a transmitting unit that transmits a transmission signal based on the modulated signal.

(22) The signal processing device according to (21), wherein
the rearranging unit divides the predictable portion of the transmission data into parts and divides a remaining portion of the transmission data into parts and rearranges the transmission data so that the rearranged transmission data alternates between one of the parts of the predictable portion and one of the parts of the remaining portion.

(23) The signal processing device according to any one of (21) and (22), wherein
the predictable portion of the transmission data includes 13 octets that are predictable by the receiver side and the remaining portion of the transmission data includes 6 octets that are not predictable by the receiver side, and
the rearranging unit divides the predictable portion into parts every two octets and divides the remaining portion into parts every octet and rearranges the transmission data so that the rearranged transmission data alternates between two octets that are predicable by the receiver side and one octet that is not predictable by the receiver side.

(24) The signal processing device according to any one of (21) through (23), wherein
the remaining portion of the transmission data includes payload information and the predictable portion of the transmission data includes a predetermined synchronization pattern that is appended to the payload information.

(25) The signal processing device according to any one of (21) through (24), wherein
the remaining portion of the transmission data further includes a cyclic redundancy check code of the payload information.

(26) The signal processing device according to any one of (21) through (25), wherein
the modulating unit modulates the phase of the carrier signal according to binary phase-shift keying modulation.

(27) The signal processing device according to any one of (21) through (26), wherein the modulating unit modulates the phase of the carrier signal according to quadrature phase-shift keying modulation.

(28) The signal processing device according to any one of (21) through (27), wherein
the rearranging unit rearranges the same transmission data a plurality of number of times,
the modulating unit modulates the phase of the carrier signal whenever the transmission data is rearranged by the rearranging unit, and
the transmitting unit transmits the transmission signal whenever the phase of the carrier signal is modulated by the modulating unit.

(29) A signal processing method comprising:
rearranging transmission data so that a predictable portion of the transmission data is spread more uniformly in the transmission data, the predictable portion including information that is predictable by a receiver side;
generating a modulated signal by modulating a phase of a carrier signal based on the rearranged transmission data; and
transmitting a transmission signal based on the modulated signal.

(30) A program for causing a computer to function as:
a rearranging unit that rearranges transmission data so that a predictable portion of the transmission data is spread more uniformly in the transmission data, the predictable portion including information that is predictable by a receiver side;
a modulating unit that generates a modulated signal by modulating a phase of a carrier signal based on the rearranged transmission data; and
a transmitting unit that transmits a transmission signal based on the modulated signal.

(31) A signal processing device comprising:
a receiving unit that receives a transmission signal and generates a reception signal based thereon, the transmission signal being for transmitting transmission data that has been rearranged so that a predictable portion of the transmission data is spread more uniformly in the transmission data, the predictable portion including information that is predictable by the signal processing device;
a detecting unit that detects a header position of each of frames of the reception signal based on the information that is predictable by the signal processing device;
an integrating unit that integrates the frames of the reception signal; and
a decoding unit that decodes the transmission data from the output of the integrating unit.

(32) The signal processing device according to (31), wherein the detecting unit is configured to:
extract a known synchronization pattern from the reception signal, where the information that is predictable to the signal processing device includes the synchronization pattern;
generate a known spreading code;
perform fast Fourier transform on the known spreading code to obtain complex spectra;
perform fast Fourier transform on the reception signal to obtain complex reception signal spectra;
perform inverse fast Fourier transform on the complex spectra and the complex reception signal spectra to obtain cross-correlation values;
calculate cross-correlation values in a predetermined period; and detect peaks of the cross-correlation values as the header positions of the frames.

(33) The signal processing device according to any one of (31) and (32), wherein
the detecting unit detects the peaks of the cross-correlation values by detecting n values in descending order from a maximum value, where n is a predetermined number of frames.

(34) The signal processing device according to any one of (31) through (33), further comprising:
a parameter calculating unit that calculates a predetermined parameter from the reception signal, wherein the detecting unit detects the header position of each of the frames based on the predetermined parameter.

(35) The signal processing device according to any one of (31) through (34), wherein
the parameter calculating unit calculates a frequency correction value of the reception signal and an initial phase of the reception signal in respective predetermined time blocks, and
the signal processing device further includes a correcting unit that corrects a frequency of the reception signal using the calculated frequency correction value and corrects an initial phase of the reception signal using the calculated initial phase.

(36) The signal processing device according to any one of (31) through (35), wherein
the parameter calculating unit calculates a cross-correlation value indicating a correlation between the reception signal and a known synchronization pattern in respective predetermined time blocks as the parameter, and
the integrating unit integrates the respective frames of the reception signal corrected by the correcting unit using the cross-correlation value calculated by the parameter calculating unit as a weighting factor of the time block.

(37) The signal processing device according to any one of (31) through (36), wherein
the transmission signal has a carrier signal of which the phase is modulated according to binary phase-shift keying modulation.

(38) The signal processing device according to any one of (31) through (37), wherein
the transmission signal has a carrier signal of which the phase is modulated according to quadrature phase-shift keying modulation.

(39) The signal processing device according to any one of (31) through (38), wherein
an unknown portion of the transmission data includes payload information and a cyclic redundancy check code of the information, and
the decoding unit determines the presence of an error in the payload information included in the transmission data using the cyclic redundancy check code.

(40) A signal processing method comprising:
receiving a transmission signal and generating a reception signal therefrom, the transmission signal being for transmitting transmission data that has been rearranged so that a predictable portion of the transmission data is spread more uniformly in the transmission data, the predictable portion including information that is predictable by a receiver;
detecting a header position of each of frames of the reception signal based on the information that is predictable by the signal processing device;
integrating the frames of the reception signal; and
decoding the transmission data from the integrated reception signal.

(41) A program for causing a computer to function as:
a receiving unit that receives a transmission signal and generates a reception signal based thereon, the transmission signal being for transmitting transmission data that has been rearranged so that a predictable portion of the transmission data is spread more uniformly in the transmission data, the predictable portion including information that is predictable by the computer;
a detecting unit that detects a header position of each of frames of the reception signal based on the information that is predictable by the signal processing device;
an integrating unit that integrates the frames of the reception signal; and
a decoding unit that decodes the transmission data from the output of the integrating unit

REFERENCE SIGNS LIST

100 Transmitter
111 CRC appender
112 Synchronization signal generator
113 Selector
114 Frame counter
115 Register
116 Interleaver
117 Gold code generator
118 Multiplier
119 Carrier oscillator
120 Multiplier
121 Band-pass filter
122 Amplifier
123 Antenna
200 Receiver
211 Antenna
212 Low-noise amplifier
213 Band-pass filter
214 Carrier oscillator
215 Multiplier
216 90-degree shifter
217 Multiplier
218 A/D converter
219 Memory
220 CPU
600 Computer

The invention claimed is:

1. A signal processing device comprising:
an interleaver configured to rearrange transmission data so that a predictable portion of the transmission data is spread more uniformly in the transmission data, the predictable portion including information that is predictable by a receiver side;
a multiplier configured to generate a modulated signal by modulating a phase of a carrier signal based on the rearranged transmission data; and
a transmitter that transmits a transmission signal based on the modulated signal,
wherein the interleaver divides the predictable portion into parts every octet and rearranges the transmission data so that the rearranged transmission data alternates between one octet that is predictable by the receiver side and another octet that is not predictable by the receiver side.

2. The signal processing device according to claim 1, wherein the transmission data includes payload information and the predictable portion of the transmission data includes a predetermined synchronization pattern that is appended to the payload information.

3. The signal processing device according to claim 2, wherein
the transmission data further includes a cyclic redundancy check code of the payload information.

4. The signal processing device according to claim 1, wherein
the transmission data includes a plurality of frames,
the interleaver rearranges each of the plurality of frames in the transmission data,
the multiplier modulates the phase of the carrier signal when one of the plurality of frames in the transmission data is rearranged by the interleaver, and
the transmitter transmits the transmission signal when the phase of the carrier signal is modulated by the multiplier.

5. A signal processing method comprising:
rearranging transmission data so that a predictable portion of the transmission data is spread more uniformly in the transmission data, the predictable portion including information that is predictable by a receiver side;
generating a modulated signal by modulating a phase of a carrier signal based on the rearranged transmission data; and
transmitting a transmission signal based on the modulated signal,
wherein rearranging the transmission data includes dividing the predictable portion into parts every octet and rearranging the transmission data so that the rearranged transmission data alternates between one octet that is predictable by the receiver side and another octet that is not predictable by the receiver side.

6. The signal processing method according to claim 5, wherein
the transmission data includes payload information and the predictable portion of the transmission data includes a predetermined synchronization pattern that is appended to the payload information.

7. The signal processing method according to claim 6, wherein
the transmission data further includes a cyclic redundancy check code of the payload information.

8. The signal processing method according to claim 5, wherein
the transmission data includes a plurality of frames,
rearranging the transmission data includes rearranging each of the plurality of frames in the transmission data,
the phase of the carrier signal is modulated when one of the plurality of frames in the transmission data is rearranged, and
the transmission signal is transmitted when the phase of the carrier signal is modulated.

9. A non-transitory computer readable medium storing program code executable by
a computer to perform operations comprising:
rearranging transmission data so that a predictable portion of the transmission data is spread more uniformly in the transmission data, the predictable portion including information that is predictable by a receiver side;
generating a modulated signal by modulating a phase of a carrier signal based on the rearranged transmission data; and
transmitting a transmission signal based on the modulated signal,
wherein rearranging the transmission data includes dividing the predictable portion into parts every octet and rearranging the transmission data so that the rearranged transmission data alternates between one octet that is predictable by the receiver side and another octet that is not predictable by the receiver side.

10. The non-transitory computer readable medium according to claim 9, wherein
the transmission data includes payload information and the predictable portion of the transmission data includes a predetermined synchronization pattern that is appended to the payload information.

11. The non-transitory computer readable medium according to claim 10, wherein
the transmission data further includes a cyclic redundancy check code of the payload information.

12. The non-transitory computer readable medium according to claim 9, wherein
the transmission data includes a plurality of frames,
rearranging the transmission data includes rearranging each of the plurality of frames in the transmission data,
the phase of the carrier signal is modulated when one of the plurality of frames in the transmission data is rearranged, and
the transmission signal is transmitted when the phase of the carrier signal is modulated.

* * * * *